US012790876B2

(12) United States Patent
Staser et al.

(10) Patent No.: US 12,790,876 B2
(45) **Date of Patent: *Nov. 10, 2026**

(54) DUAL WINDOW REGULATOR WITH OPTIMIZED MOTOR CONFIGURATION

(71) Applicant: INTEVA PRODUCTS, LLC, Troy, MI (US)

(72) Inventors: Brian H. Staser, Oxford, MI (US); Lisa Marie Hopman, Oxford, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/704,383

(22) Filed: Mar. 25, 2022

(65) Prior Publication Data

US 2022/0213729 A1 Jul. 7, 2022

Related U.S. Application Data

(63) Continuation-in-part of application No. 17/514,865, filed on Oct. 29, 2021, now Pat. No. 12,312,848.

(Continued)

(51) Int. Cl.
*E05F 15/697* (2015.01)

(52) U.S. Cl.
CPC ....... *E05F 15/697* (2015.01); *E05Y 2201/434* (2013.01); *E05Y 2201/64* (2013.01);

(Continued)

(58) Field of Classification Search
CPC ... E05F 15/697; E05F 15/689; E05F 15/6892; E05F 15/6894; E05F 15/6896;

(Continued)

(56) References Cited

U.S. PATENT DOCUMENTS 2,987,937 A 6/1961 Sala
4,051,632 A * 10/1977 Fukumoto ............. E05F 11/382 49/227

(Continued)

FOREIGN PATENT DOCUMENTS

CN 201420461 Y 3/2010
CN 203129828 U * 8/2013

(Continued)

OTHER PUBLICATIONS

French Office Action for French Application No. 22/02626 Issued Jun. 2, 2022, 7 Pages, No English Translation.

(Continued)

*Primary Examiner* — Catherine A Kelly
*Assistant Examiner* — Patrick B. Ponciano
(74) *Attorney, Agent, or Firm* — CANTOR COLBURN LLP

(57) ABSTRACT

A window regulator for raising and lowering a window of a vehicle, including: a first guide rail; a first cursor slidably mounted to the first guide rail; a second guide rail spaced from the first guide rail; a second cursor slidably mounted to the second guide rail; a flange portion mounted to a bottom end of the first guide rail, wherein the flange portion has a rail mounting portion and an arm portion extending from the rail mounting portion and a mounting portion extending from the arm portion; and a motor operably coupled to the first cursor and the second cursor such that operation of the motor will cause the first cursor to slide along the first guide rail and second cursor to slide along the second guide rail, the motor being mounted to the mounting portion, wherein the motor when mounted to the mounting portion is located adjacent to a side of the first guide rail located between the bottom end of the first guide rail and a top end of the first guide rail.

17 Claims, 17 Drawing Sheets

Related U.S. Application Data

(60) Provisional application No. 63/316,083, filed on Mar. 3, 2022, provisional application No. 63/166,777, filed on Mar. 26, 2021, provisional application No. 63/107,952, filed on Oct. 30, 2020.

(52) U.S. Cl.
CPC ... *E05Y 2201/654* (2013.01); *E05Y 2201/664* (2013.01); *E05Y 2201/668* (2013.01); *E05Y 2201/684* (2013.01); *E05Y 2600/456* (2013.01); *E05Y 2600/46* (2013.01); *E05Y 2600/626* (2013.01); *E05Y 2900/55* (2013.01)

(58) Field of Classification Search
CPC .............. E05F 15/6899; E05F 15/6901; E05F 15/6903; E05F 15/6905; E05F 15/6907; E05F 15/6909; E05F 15/6911; E05F 15/6914; E05F 15/6916; E05F 15/6918; E05Y 2201/434; E05Y 2201/64; E05Y 2201/654; E05Y 2201/664; E05Y 2201/668; E05Y 2201/684; E05Y 2600/456; E05Y 2600/46; E05Y 2600/626; E05Y 2900/55
USPC .......................................................... 49/352
See application file for complete search history.

(56) References Cited

U.S. PATENT DOCUMENTS 4,329,816 A * 5/1982 Koike .................. E05F 11/382 49/350
4,335,541 A 6/1982 Kazewych
4,420,906 A * 12/1983 Pickles ................ E05F 15/689 49/352
4,502,247 A 3/1985 Kobayashi et al.
4,575,967 A * 3/1986 Bickerstaff .............. B60J 10/79 49/211
4,700,508 A * 10/1987 Kollner ................ E05F 11/486 49/374
4,744,172 A 5/1988 Miyauchi
4,819,380 A 4/1989 Trebbi
4,835,907 A 6/1989 Heuchert
4,890,376 A * 1/1990 Boileau ...................... B60J 1/17 29/434
5,074,077 A 12/1991 Toyoshima et al.
5,694,717 A * 12/1997 Gier ..................... E05F 11/481 49/352
5,832,664 A 11/1998 Tajima et al.
5,924,245 A 7/1999 Manuel et al.
5,950,365 A * 9/1999 Lieb .......................... B60J 1/17 49/352
5,960,588 A * 10/1999 Wurm .................. E05F 11/488 49/502
5,964,063 A * 10/1999 Hisano .................. E05F 11/488 49/502
5,970,658 A 10/1999 Smith
6,354,652 B1 3/2002 Arquevaux et al.
6,516,493 B1 2/2003 Seliger et al.
6,536,164 B1 3/2003 Kirejczyk
6,688,043 B1 2/2004 Feder et al.
6,820,370 B2 * 11/2004 Marscholl ............ E05F 11/483 49/502
6,874,279 B1 4/2005 Weber et al.
6,910,730 B2 * 6/2005 Kinoshita ............ E05F 11/488 296/146.7
6,931,791 B1 * 8/2005 Pleiss ..................... B60J 5/0416 49/502
7,047,692 B2 5/2006 Benoit et al.
7,076,918 B2 7/2006 Tatsumi et al.
7,121,044 B2 10/2006 Santaolalla et al.
7,150,493 B2 12/2006 Kinoshita et al.
7,555,868 B2 7/2009 Tenorio et al.
7,617,633 B2 11/2009 Shimura et al.
7,793,464 B2 9/2010 Buecker et al.
7,797,882 B2 * 9/2010 Lubaway .............. E05F 11/445 49/352
7,877,932 B2 * 2/2011 Kriese ................... E05F 11/483 49/502
7,882,658 B2 * 2/2011 Staser ................... E05F 11/486 49/352
8,109,039 B2 2/2012 Krueger et al.
8,671,621 B2 3/2014 Yoshida et al.
8,844,198 B2 * 9/2014 Raisoni ................. E05F 11/382 264/328.8
8,935,886 B2 * 1/2015 Pavlovic ................ B60J 5/0416 49/352
8,943,665 B2 2/2015 Walawender et al.
9,163,448 B2 10/2015 Imaoka
9,580,953 B1 2/2017 Matsushita
10,221,608 B2 3/2019 Fever et al.
10,273,733 B2 * 4/2019 Huang ....................... B60J 1/17
10,309,140 B2 6/2019 Imaoka
10,669,764 B2 * 6/2020 Fortin .................. E05D 15/165
10,676,975 B2 6/2020 Fortin et al.
10,711,502 B2 7/2020 Yokoyama et al.
10,829,973 B2 11/2020 Hazon et al.
11,125,002 B2 9/2021 Pavlovic et al.
11,162,291 B2 * 11/2021 Reames ................ E05F 11/488
12,281,511 B2 * 4/2025 Ramesh ................ E05F 15/697
2003/0029092 A1 2/2003 Bertolini et al.
2003/0101654 A1 6/2003 Dufour
2003/0106267 A1 * 6/2003 Dron ..................... E05F 11/488 49/374
2004/0227376 A1 11/2004 Kinoshita et al.
2004/0237699 A1 12/2004 Kinoshita et al.
2006/0143985 A1 * 7/2006 Garcia Martin ...... E05F 11/488 49/352
2006/0174542 A1 8/2006 Bernard et al.
2007/0180773 A1 8/2007 Fortin et al.
2007/0193119 A1 8/2007 Hoffman
2007/0220811 A1 9/2007 Flendrig et al.
2007/0277441 A1 12/2007 Smith et al.
2008/0005971 A1 1/2008 Dickie et al.
2009/0265993 A1 * 10/2009 Shah ..................... E05F 11/488 49/502
2010/0223852 A1 9/2010 Arimoto et al.
2011/0047878 A1 * 3/2011 Raisoni ................. E05D 15/165 264/254
2013/0098183 A1 4/2013 Fever et al.
2013/0219794 A1 8/2013 Nakamura et al.
2013/0318876 A1 12/2013 Takakura et al.
2014/0237900 A1 8/2014 Imaoka
2015/0101252 A1 4/2015 Baba
2016/0047411 A1 * 2/2016 Simonneau ............... F16C 1/26 74/502.5
2017/0268273 A1 9/2017 Matsushita
2019/0226264 A1 7/2019 Shiroma
2019/0390757 A1 * 12/2019 Matsushita ......... F16H 57/0031
2020/0157870 A1 * 5/2020 Staser ................... E05F 11/486
2022/0136298 A1 5/2022 Staser et al.
2022/0145687 A1 * 5/2022 Trautmann ............ E05F 15/689
2022/0213729 A1 * 7/2022 Staser ................... E05F 15/697
2023/0279713 A1 9/2023 Staser et al.

FOREIGN PATENT DOCUMENTS

CN 108005519 A 5/2018
CN 110409950 A 11/2019
CN 111236789 A 6/2020
CN 211173657 U 8/2020
CN 217780190 U 11/2022
DE 19836705 A1 * 2/2000 .............. E05F 15/41
DE 102008000477 A1 * 9/2009 ............ E05F 15/697
DE 102013104602 A1 * 11/2014 ................ B60J 3/04
FR 2832753 A1 5/2003
JP H1136712 A * 2/1999
JP 2015200148 A 11/2015
JP 2019138117 A 8/2019
KR 970027629 * 7/1997
KR 19990027962 * 7/1999

(56) References Cited

FOREIGN PATENT DOCUMENTS

| | | | | | |
|---|---|---|---|---|---|
| KR | 20070101728 | A | * | 10/2007 | ................ B60J 1/17 |
| KR | 20110043370 | A | * | 10/2009 | |
| KR | 1020110043370 | A | | 4/2011 | |
| KR | 20130065010 | A | * | 6/2013 | .......... E05F 15/6892 |
| WO | 2022094276 | A1 | | 5/2003 | |
| WO | WO-2010112305 | A1 | * | 10/2010 | ............ E05F 15/689 |
| WO | WO_2020109539 | | * | 6/2020 | |

OTHER PUBLICATIONS

International Search Report for International Application No. PCT/US2021/057354; Date of Completion: Feb. 18, 2022; Date of Mailing: Feb. 21, 2022; 3 Pages.
Written Opinion for International Application No. PCT/US2021/057354; Date of Completion: Feb. 18, 2022; Date of Mailing: Feb. 21, 2022; 5 Pages.
IPRP Mailed May 11, 2023 for International Application No. PCT/US2021/057354; 6 Pages.
Non-Final Office Action dated Jun. 21, 2023 in U.S. Appl. No. 17/514,865.
AFCP Decision dated Feb. 23, 2024.
Non-Final Office action dated Feb. 12, 2024.
U.S. Non-Final Office Action corresponding to U.S. Appl. No. 17/514,865; Mailing Date, Apr. 3, 2024.
French Search Opinion corresponding to FR Application No. 2202626; Issue Date: Jan. 29, 2025, 14 pages.
Advisory Action corresponding to U.S. Appl. No. 17/514,865; Issue Date, Feb. 23, 2024, 6 pages.
U.S. Non-Final Office Action corresponding to U.S. Appl. No. 18/117,026; Issue Date, Feb. 12, 2024, 24 pages.
International Preliminary Report on Patentability corresponding to International Application No. PCT/US2021/057354; Mailing Date, May 11, 2023, 6 pages.
U.S. Non-Final Office Action corresponding to U.S. Appl. No. 17/514,865; Issue Date, Jun. 21, 2023, 53 pages.
CNIPA The Notification of the First Office Action corresponding to CN Application No. 202210311556.7; Issue Date, May 6, 2025, 33 pages.
CNIPA Notification of the First Office Action corresponding to CN Application No. 202310202907.5; Issue date, Sep. 20, 2025, 18 pages.
CNIPA Second Office Action corresponding to CN Application No. 202310202907.5; Issue date, Apr. 1, 2026, 18 pages.
Chinese Office Action corresponding to CN Application No. 202180073473.2; Issue date, Apr. 22, 2026, 21 pages.
Chinese Office Action corresponding to CN Application No. 202210311556.7; Issue date, Apr. 30, 2026, 39 pages.
CNIPA Rejection Decision corresponding to CN Application No. 20231020907.5; Issue date, Jul. 28, 2026, 14 pages.

* cited by examiner

DUAL WINDOW REGULATOR WITH OPTIMIZED MOTOR CONFIGURATION

CROSS REFERENCE TO RELATED APPLICATIONS

This application claims the benefit of U.S. Provisional Patent Application No. 63/166,777 filed on Mar. 26, 2021, the entire contents of which are incorporated herein by reference thereto.

This application claims the benefit of U.S. Provisional Patent Application No. 63/316,083 filed on Mar. 3, 2022, the entire contents of which are incorporated herein by reference thereto.

This application is a continuation-in-part of U.S. patent application Ser. No. 17/514,865 filed on Oct. 29, 2021 which claims priority to U.S. Provisional Patent Application No. 63/107,952 filed on Oct. 30, 2020, the entire contents each of which are incorporated herein by reference thereto.

BACKGROUND

Exemplary embodiments pertain to the art of vehicles, and more particularly to window regulators for vehicles.

Passenger vehicles typically have windows surrounding the passenger compartment. Windows in doors of the vehicle may be designed to be raised and lowered electrically by an operator. The operator may be the driver or a passenger usually using an interior switch. The physical raising and lowering of a window is performed by an electromechanical device referred to as a window regulator. The window regulator is typically located within a vehicle door cavity. The vehicle door cavity has limited available space for such components. As such, it is desired to provide a window regulator that has a smaller profile.

BRIEF DESCRIPTION

Disclosed is a window regulator for raising and lowering a window of a vehicle, including: a first guide rail; a first cursor slidably mounted to the first guide rail; a second guide rail spaced from the first guide rail; a second cursor slidably mounted to the second guide rail; a flange portion mounted to a bottom end of the first guide rail, wherein the flange portion has a rail mounting portion and an arm portion extending from the rail mounting portion and a mounting portion extending from the arm portion; and a motor operably coupled to the first cursor and the second cursor such that operation of the motor will cause the first cursor to slide along the first guide rail and second cursor to slide along the second guide rail, the motor being mounted to the mounting portion, wherein the motor when mounted to the mounting portion is located adjacent to a side of the first guide rail located between the bottom end of the first guide rail and a top end of the first guide rail.

In addition to one or more of the features described above, or as an alternative to any of the foregoing embodiments, the window regulator includes a cable drum rotationally mounted to the flange portion, the cable drum being operably coupled to the motor and at least one cable secured to the cable drum at one end and the first cursor and the second cursor at another end.

Disclosed is a window regulator for raising and lowering a window of a vehicle, including: a first guide rail; a first cursor slidably mounted to the first guide rail; a second guide rail spaced from the first guide rail; a second cursor slidably mounted to the second guide rail; a flange portion mounted to a top end of the first guide rail, wherein the flange portion has a rail mounting portion and an arm portion extending from the rail mounting portion and a mounting portion extending from the arm portion; and a motor operably coupled to the first cursor and the second cursor such that operation of the motor will cause the first cursor to slide along the first guide rail and the second cursor to slide along the second guide rail, the motor being mounted to the mounting portion, wherein the motor when mounted to the mounting portion is located adjacent to a side of the first guide rail located between a bottom end of the first guide rail and the top end of the first guide rail.

In addition to one or more of the features described above, or as an alternative to any of the foregoing embodiments, the window regulator includes a lower pulley rotationally mounted to the rail mounting portion and an upper pulley rotationally secured to secured to the top end of the first guide rail by a housing.

In addition to one or more of the features described above, or as an alternative to any of the foregoing embodiments, the first guide rail is a three sided structure with an opening and the first guide rail is insert molded onto the flange portion the flange portion has a structural member that extends into the opening.

In addition to one or more of the features described above, or as an alternative to any of the foregoing embodiments, the first guide rail and the second guide rail are extruded structures that have internal structural features that extend across a cavity of the first guide rail and the second guide rail.

In addition to one or more of the features described above, or as an alternative to any of the foregoing embodiments, the first guide rail has a rectangular periphery and a portion of the first cursor completely surrounds the first guide rail and wherein the second guide rail has a rectangular periphery and a portion of the second cursor completely surrounds the second guide rail.

In addition to one or more of the features described above, or as an alternative to any of the foregoing embodiments, the first guide rail and the second guide rail are hollow.

In addition to one or more of the features described above, or as an alternative to any of the foregoing embodiments, the portion of the first cursor surrounding the first guide rail has multiple contact points with the first guide rail in order to prevent undesired movement of the first cursor as it slides up and down the first guide rail, and wherein the portion of the second cursor surrounding the second guide rail has multiple contact points with the second guide rail in order to prevent undesired movement of the second cursor as it slides up and down the second guide rail.

In addition to one or more of the features described above, or as an alternative to any of the foregoing embodiments, the rail mounting portion, the arm portion extending and the mounting portion are all formed as a single piece.

In addition to one or more of the features described above, or as an alternative to any of the foregoing embodiments, the motor extends in a direction generally parallel to the first guide rail.

In addition to one or more of the features described above, or as an alternative to any of the foregoing embodiments, a pair of cables are secured to a cable drum rotationally mounted to the flange portion at one end and one of the pair of cables is secured to the first cursor at another end and the other one of the pair of cables is secured to the second cursor at another end.

In addition to one or more of the features described above, or as an alternative to any of the foregoing embodiments, the first cursor has an insert that defines an opening for the first guide rail to slide therethrough and the second cursor has an insert that defines an opening for the second guide rail to slide therethrough.

In addition to one or more of the features described above, or as an alternative to any of the foregoing embodiments, the insert of the first cursor is formed from polyoxymethylene (POM) and the first cursor is over-molded onto the insert of the first cursor and the insert of the second cursor is formed from polyoxymethylene (POM) and the second cursor is over-molded onto the insert of the second cursor.

In addition to one or more of the features described above, or as an alternative to any of the foregoing embodiments, the first cursor and the second cursor are formed from nylon.

In addition to one or more of the features described above, or as an alternative to any of the foregoing embodiments, the first guide rail is a forward guide rail and the second guide rail is a rear guide rail.

In addition to one or more of the features described above, or as an alternative to any of the foregoing embodiments, the window regulator includes a lower pulley rotationally mounted to the rail mounting portion and an upper pulley rotationally secured to secured to the top end of the first guide rail by a first housing and a lower pulley rotationally mounted to a bottom end of the second guide rail by a second housing, the first housing and the second housing having the same configuration.

In addition to one or more of the features described above, or as an alternative to any of the foregoing embodiments, the window regulator includes a pulley rotationally secured to secured to a top end of the second guide rail by a third housing, the third housing being a mirror image of the first housing.

In addition to one or more of the features described above, or as an alternative to any of the foregoing embodiments, the first guide rail has a rectangular periphery and a portion of the first cursor completely surrounds the first guide rail and wherein the second guide rail has a rectangular periphery and a portion of the second cursor completely surrounds the second guide rail and wherein the first guide rail and the second guide rail are hollow.

In addition to one or more of the features described above, or as an alternative to any of the foregoing embodiments, the first cursor has an insert that defines an opening for the first guide rail to slide therethrough and the second cursor has an insert that defines an opening for the second guide rail to slide therethrough.

Also disclosed is a window regulator for raising and lowering a window of a vehicle, the window regulator including: a first guide rail; a first cursor slidably mounted to the first guide rail; a second guide rail spaced from the first guide rail; a second cursor slidably mounted to the second guide rail; a motor operably coupled to the first cursor and the second cursor such that operation of the motor will cause the first cursor to slide along the first guide rail and second cursor to slide along the second guide rail, the motor being mounted to a mounting portion that is not secured to either the first guide rail or the second guide rail, wherein the motor when mounted to the mounting portion is located adjacent to a side of the first guide rail located between a bottom end of the first guide rail and a top end of the first guide rail; and wherein the first guide rail has a rectangular periphery and a portion of the first cursor completely surrounds the first guide rail and wherein the second guide rail has a rectangular periphery and a portion of the second cursor completely surrounds the second guide rail, and the first guide rail and the second guide rail are hollow, and the first cursor has an insert that defines an opening for the first guide rail to slide therethrough and the second cursor has an insert that defines an opening for the second guide rail to slide therethrough.

Disclosed is a window regulator, including: a first guide rail; a first cursor slidably mounted to the first guide rail; a second guide rail spaced from the first guide rail; a second cursor slidably mounted to the second guide rail; a housing that is not mounted to a lower end of the first guide rail; a motor mounted to the housing and operably coupled to the first cursor and the second cursor such that operation of the motor will cause the first cursor to slide along the first guide rail and second cursor to slide along the second guide rail; a cable drum rotationally mounted to the housing, the cable drum being operably coupled to the motor and a first cable secured to the cable drum at one end and the first cursor at another end; a second cable secured to the cable drum at one end and the second cursor at another end; a third cable secured to the first cursor at one end and the second cursor at another end; a first cable sheath surrounding the first cable that extends from a first feature of the first guide rail to the housing; a cable tensioner associated with the first cable sheath; a second cable sheath surrounding the second cable that extends from the housing to a second feature of the second guide rail; and a third cable sheath surrounding the third cable that extends from the a second feature of the first guide rail to a first feature of the second guide rail, wherein the window regulator is configured for raising and lowering a window of a frameless door assembly of a vehicle.

In addition to one or more of the features described above, or as an alternative to any of the foregoing embodiments, a pulley is rotationally mounted to each of the first feature of the first guide rail, the second feature of the second guide rail, the first feature of the second guide rail and the second feature of the second guide rail.

In addition to one or more of the features described above, or as an alternative to any of the foregoing embodiments, the first guide rail and the second guide rail are hollow structures.

In addition to one or more of the features described above, or as an alternative to any of the foregoing embodiments, the first guide rail has a rectangular periphery and a portion of the first cursor completely surrounds the first guide rail and wherein the second guide rail has a rectangular periphery and a portion of the second cursor completely surrounds the second guide rail.

In addition to one or more of the features described above, or as an alternative to any of the foregoing embodiments, the first guide rail and the second guide rail are hollow.

In addition to one or more of the features described above, or as an alternative to any of the foregoing embodiments, the portion of the first cursor surrounding the first guide rail has multiple contact points with the first guide rail in order to prevent undesired movement of the first cursor as it slides up and down the first guide rail, and wherein the portion of the second cursor surrounding the second guide rail has multiple contact points with the second guide rail in order to prevent undesired movement of the second cursor as it slides up and down the second guide rail.

In addition to one or more of the features described above, or as an alternative to any of the foregoing embodiments, the first cursor has an insert that defines an opening for the first guide rail to slide therethrough and the second cursor has an insert that defines an opening for the second guide rail to slide therethrough.

In addition to one or more of the features described above, or as an alternative to any of the foregoing embodiments, the insert of the first cursor is formed from polyoxymethylene (POM) and a portion of the first cursor is positioned over the insert of the first cursor and the insert of the second cursor is formed from polyoxymethylene (POM) and a portion of the second cursor is positioned over the insert of the second cursor.

In addition to one or more of the features described above, or as an alternative to any of the foregoing embodiments, the first cursor and the second cursor are formed from nylon.

In addition to one or more of the features described above, or as an alternative to any of the foregoing embodiments, the first guide rail is a forward guide rail and the second guide rail is a rear guide rail.

In addition to one or more of the features described above, or as an alternative to any of the foregoing embodiments, the first guide rail and the second guide rail are hollow structures.

In addition to one or more of the features described above, or as an alternative to any of the foregoing embodiments, the first guide rail has a rectangular periphery and a portion of the first cursor completely surrounds the first guide rail and wherein the second guide rail has a rectangular periphery and a portion of the second cursor completely surrounds the second guide rail.

In addition to one or more of the features described above, or as an alternative to any of the foregoing embodiments, wherein the first guide rail and the second guide rail are hollow.

In addition to one or more of the features described above, or as an alternative to any of the foregoing embodiments, the portion of the first cursor surrounding the first guide rail has multiple contact points with the first guide rail in order to prevent undesired movement of the first cursor as it slides up and down the first guide rail, and wherein the portion of the second cursor surrounding the second guide rail has multiple contact points with the second guide rail in order to prevent undesired movement of the second cursor as it slides up and down the second guide rail.

In addition to one or more of the features described above, or as an alternative to any of the foregoing embodiments, wherein the first cursor has an insert that defines an opening for the first guide rail to slide therethrough and the second cursor has an insert that defines an opening for the second guide rail to slide therethrough.

In addition to one or more of the features described above, or as an alternative to any of the foregoing embodiments, the insert of the first cursor is formed from polyoxymethylene (POM) and a portion of the first cursor is positioned over the insert of the first cursor and the insert of the second cursor is formed from polyoxymethylene (POM) and a portion of the second cursor is positioned over the insert of the second cursor.

In addition to one or more of the features described above, or as an alternative to any of the foregoing embodiments, the first cursor and the second cursor are formed from nylon.

In addition to one or more of the features described above, or as an alternative to any of the foregoing embodiments, the first guide rail is a forward guide rail and the second guide rail is a rear guide rail.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Disclosed herein is an apparatus for raising and lowering a window of a vehicle. The apparatus may be referred to as a "window regulator". In one or more embodiments, the window regulator is an electromechanical device that can be controlled by a user inside the vehicle such as by operating a switch.

Figure 1:
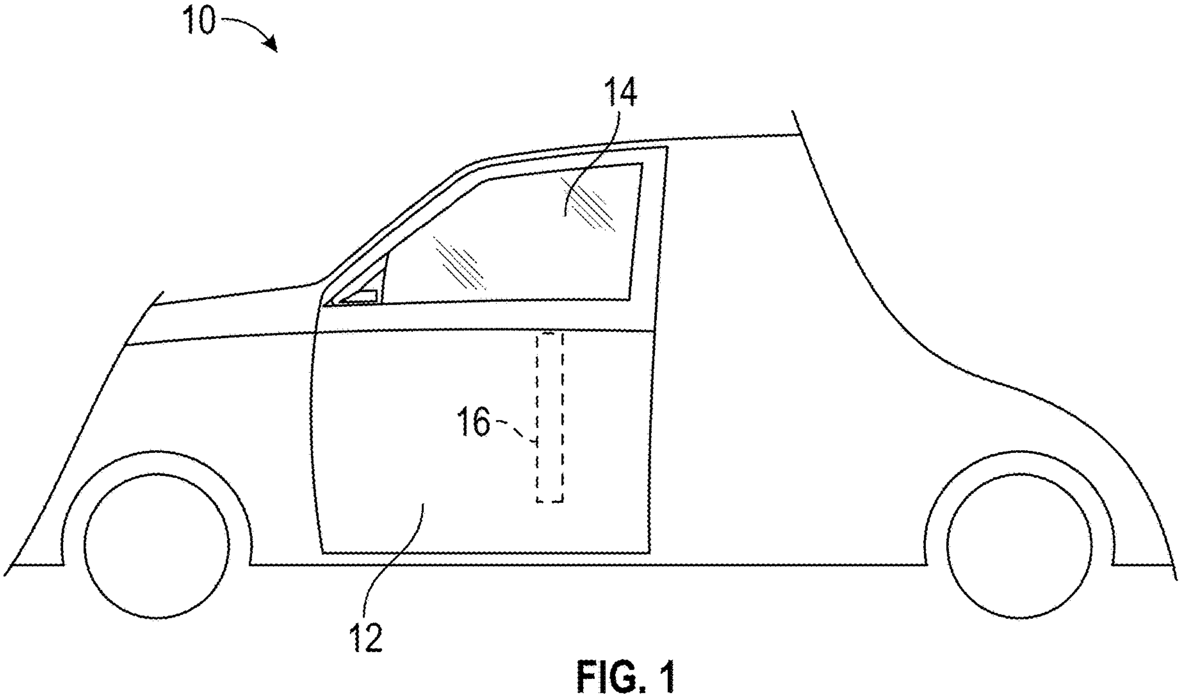
FIG. 1 is a partial view of a vehicle having a window regulator according to the present disclosure.

FIG. 1 is a partial side view of a vehicle 10 having at least one door 12 with a window 14 that is configured to be raised and lowered by a window regulator 16 disposed within door panels (e.g., exterior and interior) of the door 12. Although, only one door 12 and window 14 is illustrated it is contemplated that the window regulator or the present disclosure can be used in a vehicle having numerous doors and associated windows. As such, one or more other windows 14 of the vehicle 10 may also be operated by a window regulator 16 according to the present disclosure.

Figure 2:
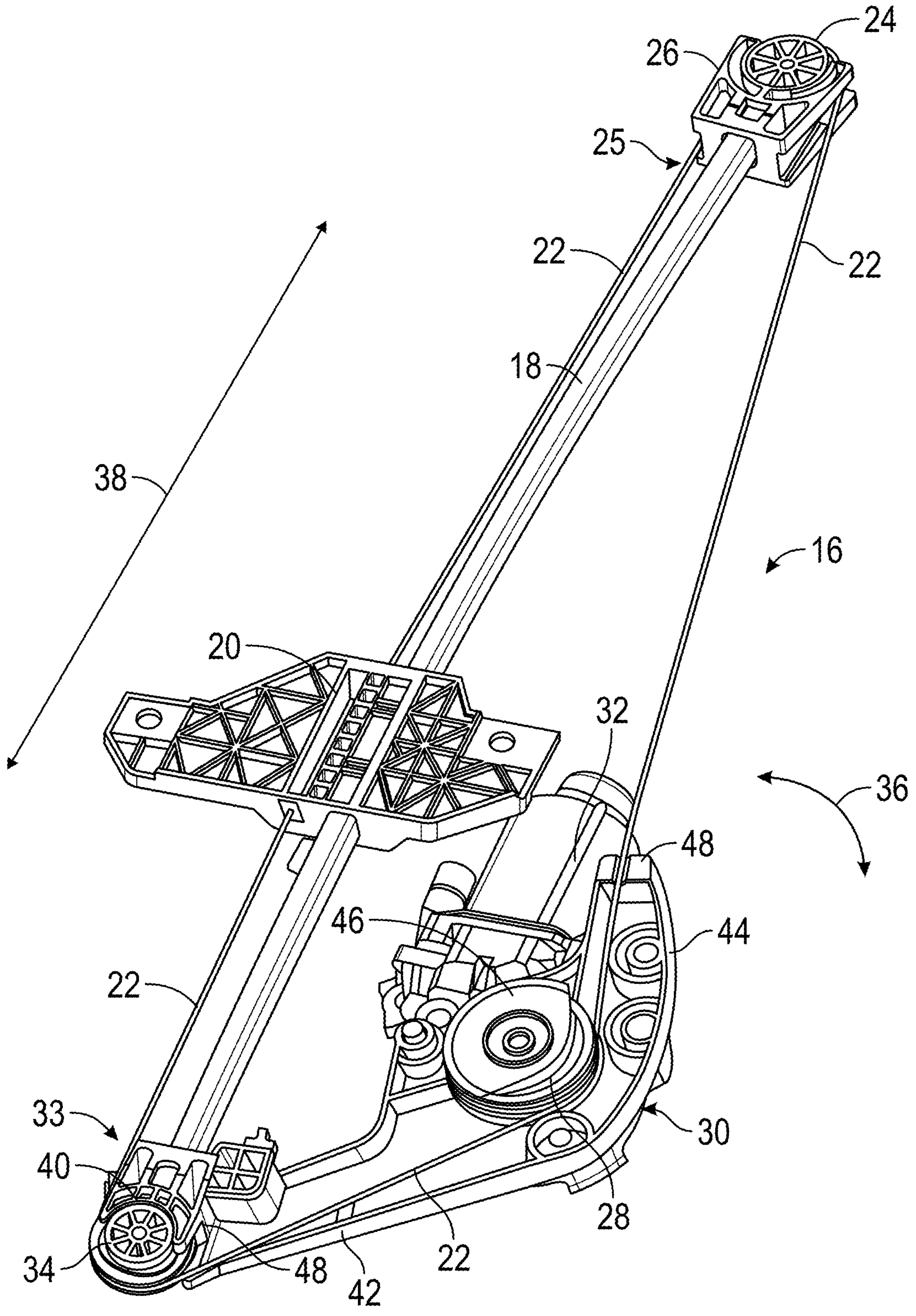
FIG. 2 is a perspective view of a window regulator according to the present disclosure.

FIG. 2 if a perspective view of the window regulator 16. The window regulator 16 includes a guide rail 18 and a cursor 20 that is slidably secured to the guide rail 18. The cursor 20 is configured to be secured to the window 14 and is operably coupled to a cable 22 or cables 22 that are secured to the cursor 20. The window regulator 16 has an upper pulley or upper cam 24 that is secured to a top portion or top end 25 of the guide rail 18 by a housing or feature 26. As illustrated, the upper pulley or upper cam 24 is aligned with the guide rail 18. In the event a pulley is used, the upper pulley 24 is rotationally received in the housing or feature 26. The upper pulley or upper cam is configured to receive either rotationally or slidably cable 22. The cable 22 is secured to the cursor 20 at one end and a cable drum 28 at an opposite end.

The cable drum 28 is rotationally mounted to a housing or flange portion 30. In order to provide rotational movement to the cable drum 28, a motor 32 is operably coupled to the cable drum 28 by for example a worm drive (not shown) that is rotated by the motor 32. The housing or flange portion 30 is secured to a bottom portion or bottom end 33 of the guide rail 18. As used herein, the top end 25 of the guide rail 18 is located closer to a top of the vehicle door 12 than the bottom end 33 when the window regulator 16 is secured to the vehicle door 12.

The housing or flange portion 30 also has a lower pulley or lower cam 34 secured to the housing. In the event a pulley is used, the lower pulley 34 is rotationally received in the housing 30. As illustrated, the lower pulley or lower cam 34 is aligned with the guide rail 18. The lower pulley or lower cam 34 is configured to rotationally or slidably received cable 22.

As mentioned above, a cable 22 or a pair of cables 22 are secured to the cable drum 28 and the cursor 20. In the event, a pair of cables 22 are employed one of the pair of cables 22 is secured to the cursor 20 at one end and the cable drum 28 at the other end and the other one of the cables 22 is secured to the cursor 20 at one end and the cable drum 28 at the other end.

As the cable drum 28 is rotated in the direction of arrows 36 one of the cables 22 (when two are used) will wind up on the cable drum 28 while the other unwinds thus causing movement of the cursor 20 in the directions of arrows 38. Movement of the cursor in the directions of arrows 38 will cause the window 14 to move up and down with respect to the vehicle door 12. In the event a single cable 22 is used a portion of the cable will wind on cable drum 28 while another portion will unwind from the cable drum 28 in order to provide the desired movement of the cursor 20 in the direction of arrows 38.

Figure 3:
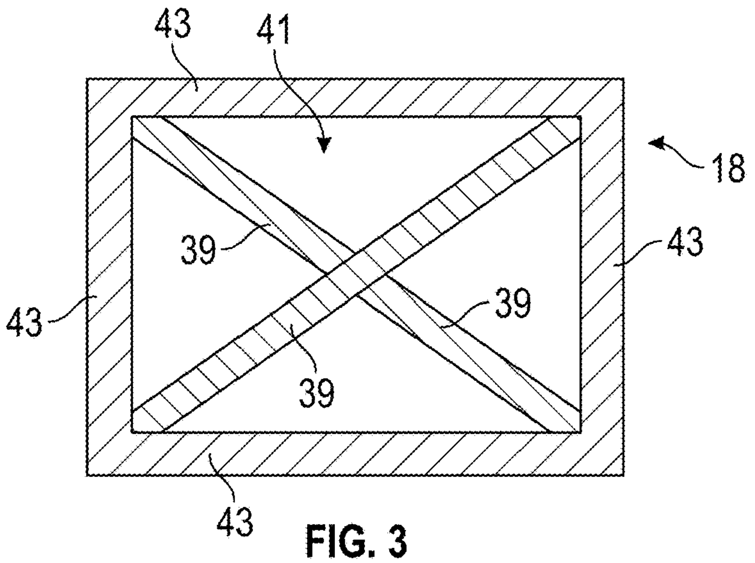
FIG. 3 is a cross sectional view of a guide rail for use with a window regulator according to the present disclosure.

In one non-limiting embodiment, the guide rail 18 is a hollow tube or structure formed from a metal such as aluminum, steel, metallic alloys or the hollow tube formed from a plastic material, or a plastic composite material. In one alternative and as illustrated in at least FIG. 3, the guide rail 18 is an extruded structure that has internal structural features, supports or ribs 39 that extend across a cavity 41 of the guide rail. In this embodiment the internal structural features, supports or ribs 39 extend from an interior surface of the wall or walls that define an exterior surface of the guide rail 18. The exterior surface being opposite to the interior surface of the wall or walls.

In addition and in one non-limiting embodiment, the housing or flange portion 30 and the housing or feature 26 are formed from an easily molded material such as a plastic material, metal insert reinforced plastic or a plastic composite material. Alternatively, the guide rail 18 may be solid. In various embodiments of the present disclosure, the guide rail may have a square or rectangular configuration or periphery.

Not shown are a controller for controlling the motor 32 and inputs to the controller such as user operated switches and a vehicle control module that may also provide input to the controller. Also not shown is an electric power supply system, which may include a battery and alternator as vehicle electric power supply systems and window controllers are well known in the art, these components are not discussed in further detail.

In one embodiment, the cursor 20 or a portion thereof is configured to completely surround a periphery of the guide rail 18. As such, the portion of the cursor 20 surrounding the guide rail 18 will have multiple contact points with the guide rail in order to prevent undesired twisting, rotation or movement of the cursor as it slides up and down the guide rail 18 in the direction of arrows 38. In being understood, that some minor rotation, movement or twisting of the cursor 20 about an axis (extending generally in the direction of arrows 38) of the guide rail 18 is acceptable for operation of the window regulator.

As illustrated in FIG. 2, the housing or flange portion 30 is configured to be mounted to the bottom portion or bottom end 33 of the guide rail 18 and motor 32 is secured to the bottom portion or bottom end 33 of the guide rail 18 via the housing or flange portion 30 as opposed to a bottom mount motor where the motor is mounted to the bottom of the guide rail and the cable drum of the motor assembly is the pulley located at the bottom of the guide rail. Since a bottom mount motor is typically located at the end 33 of the guide rail 18 the motor 32 and its housing may inhibit the movement of the cursor 20 and thus the movement of the window 14.

In accordance with the present disclosure and in order mount the motor 32 to the end 33 of the guide rail 18 the housing or flange portion 30 is configured to have a rail mounting portion 40 that engages the end 33 of the guide rail 18 while an arm portion 42 extends from the rail mounting portion 40 in a direction away from the guide rail 18 such that the motor 32 when mounted to the housing or flange portion 30 is located adjacent to a side of the guide rail 18. As such, when the motor 32 is mounted to the housing or flange portion 30 the motor 32 is located adjacent to a side of the guide rail 18 located between the bottom end 33 of the guide rail 18 and a top end 25 of the guide rail 18. In one embodiment, the arm portion extends laterally and upwardly towards the top end 25 of the guide rail 18 from the bottom end 33 of the guide rail 18.

In one embodiment, the motor 32 can be orientated to extend in a direction generally parallel to the guide rail 18 in order to reduce the required real estate for the window regulator 16 when it is installed in a vehicle door 12.

Alternatively, the motor 32 need not be parallel to the guide rail 18 as long as it is located at a side of the guide rail 18 so as to avoid the limited applications of traditional bottom mount motor systems which have limited applications due to glass drop limitations with packaging a motor at the bottom of the rail.

The housing or flange portion 30 also has a mounting portion 44 extending from the arm portion 42. The mounting portion 44 is configured to have the motor 32 mounted thereto and also includes a housing 46 configured to rotationally receive the cable drum 28.

The housing or flange portion 30 may also have cable guides 48 that are configured to guide cable(s) 22 as they are wound and unwound from the cable drum 28.

In one embodiment, the housing or flange portion 30 is formed as a single piece such that the rail mounting portion 40, the arm portion 42, the mounting portion 44 and the housing 46 are all formed together as a single component (e.g., they are all formed as a single piece by for example an injection molding or casing process). As such and when the rail mounting portion 40, the arm portion 42, the mounting portion 44 and the housing 46 or any combination thereof are referred to as being integrally formed it is understood that the housing or flange portion 30 they will be all formed together as a single component (e.g., they are all formed as a single piece).

In yet another alternative embodiment, the guide rail 18 may be a three sided structure with an opening or channel 50 such as a substantially "C" or "U" shaped configuration when viewed from an end or in a cross-sectional view. See for example, FIGS. 4A and 4B wherein the guide rail 18 has a bottom portion 52 with a pair of integrally formed opposing sidewalls 54 that define opening or channel 50. In one alternative embodiment, the pair of integrally formed opposing sidewalls 54 each have a lip portion 56. Alternatively, the pair of integrally formed opposing sidewalls 54 are straight and do not have a lip portion 56. In one embodiment, the guide rail 18 illustrated in FIG. 4A is formed as a single unitary piece that may be formed from a metal such as aluminum, steel, metallic alloys or the guide rail 18 is formed from a plastic material, or a plastic composite material.

Figure 4A:
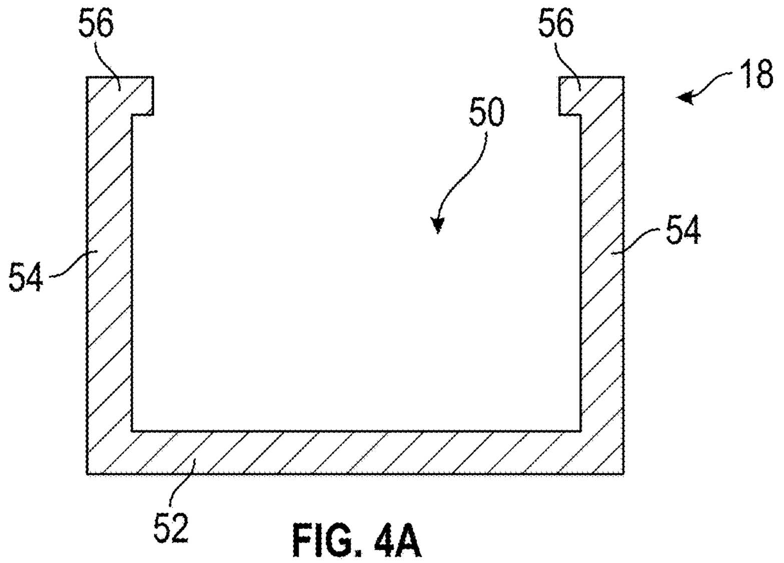
FIGS. 4A and 4B are cross sectional views of a guide rail for use with a window regulator according to the present disclosure.
Figure 4B:
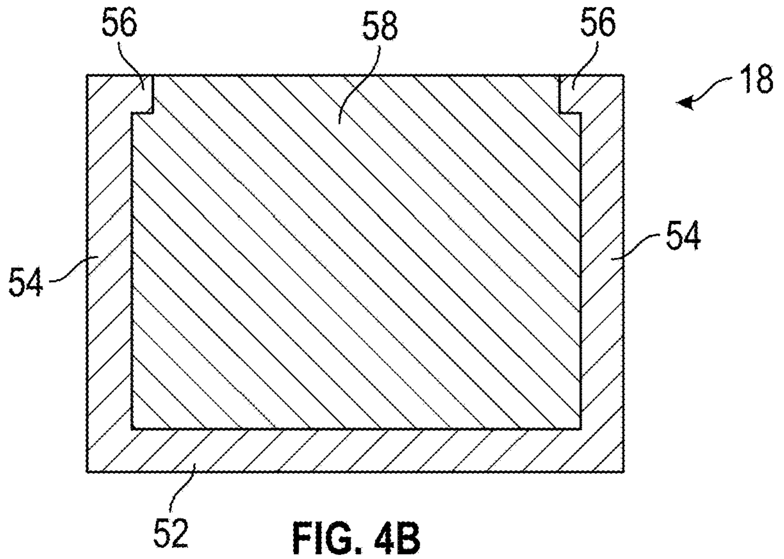
Figure 5E:
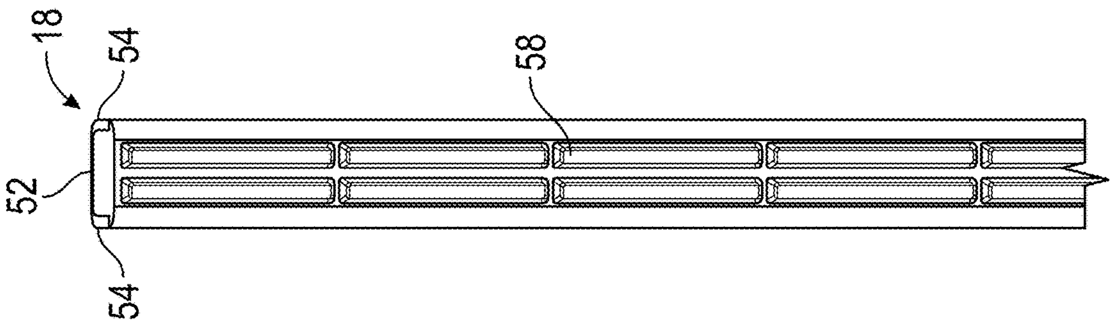
FIGS. 5A-5E illustrate various configurations of a structural member for use with a guide rail in accordance with the present disclosure.
Figure 5D:
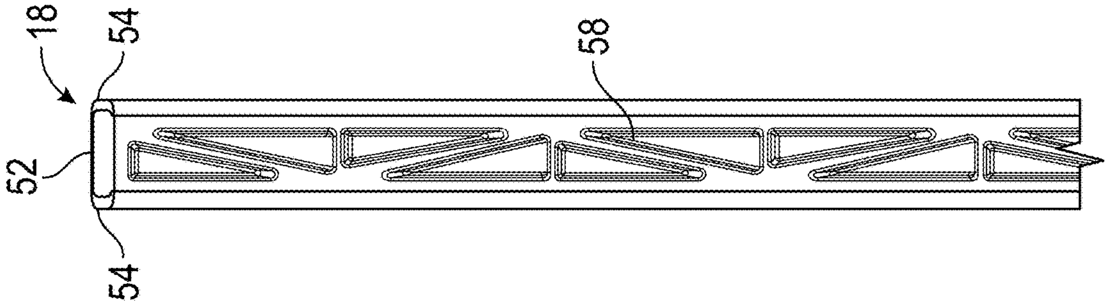
Figure 5C:
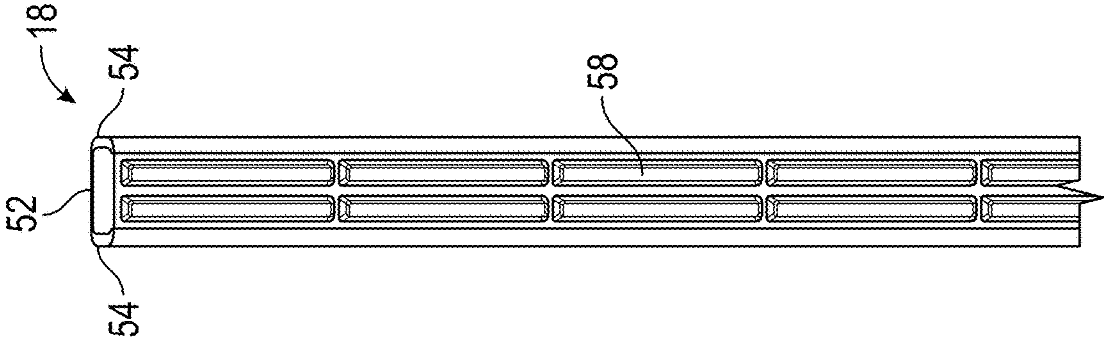
Figure 5B:
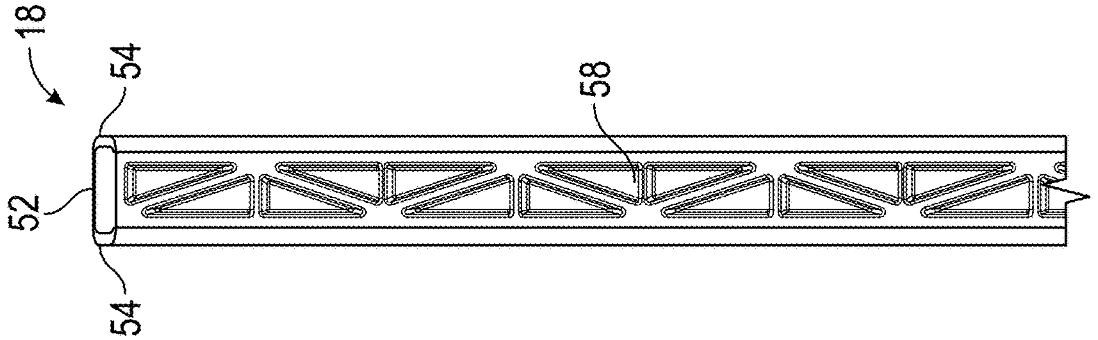
Figure 5A:
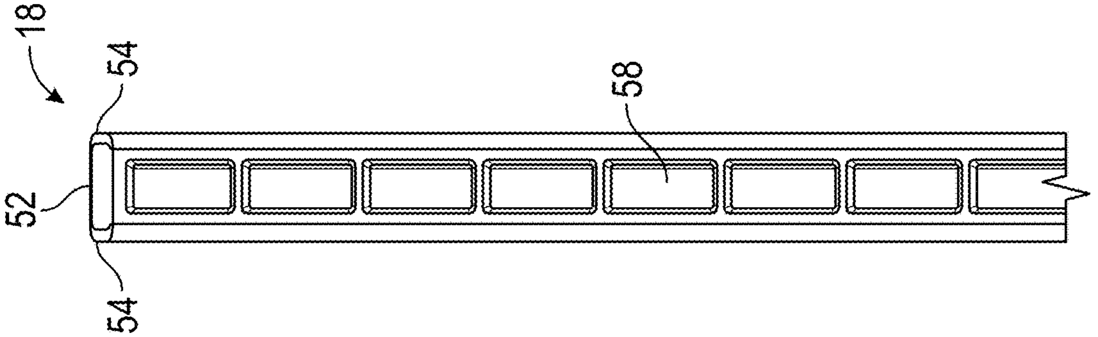
Figure 6B:
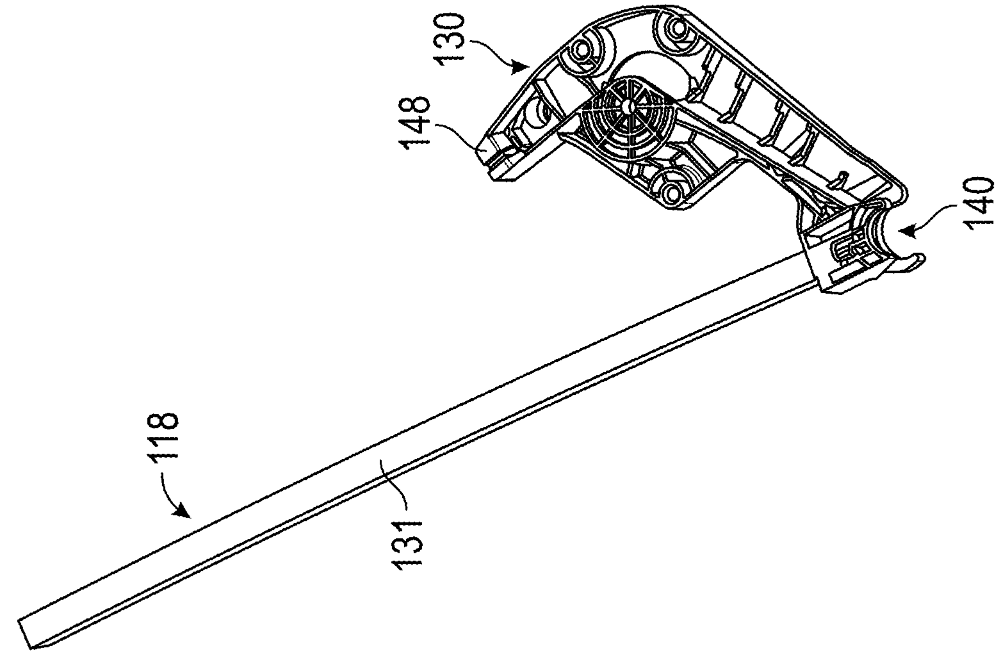
FIGS. 6A and 6B are perspective views of a guide rail with an integral housing or flange portion formed as a single unitary structure.
Figure 6A:
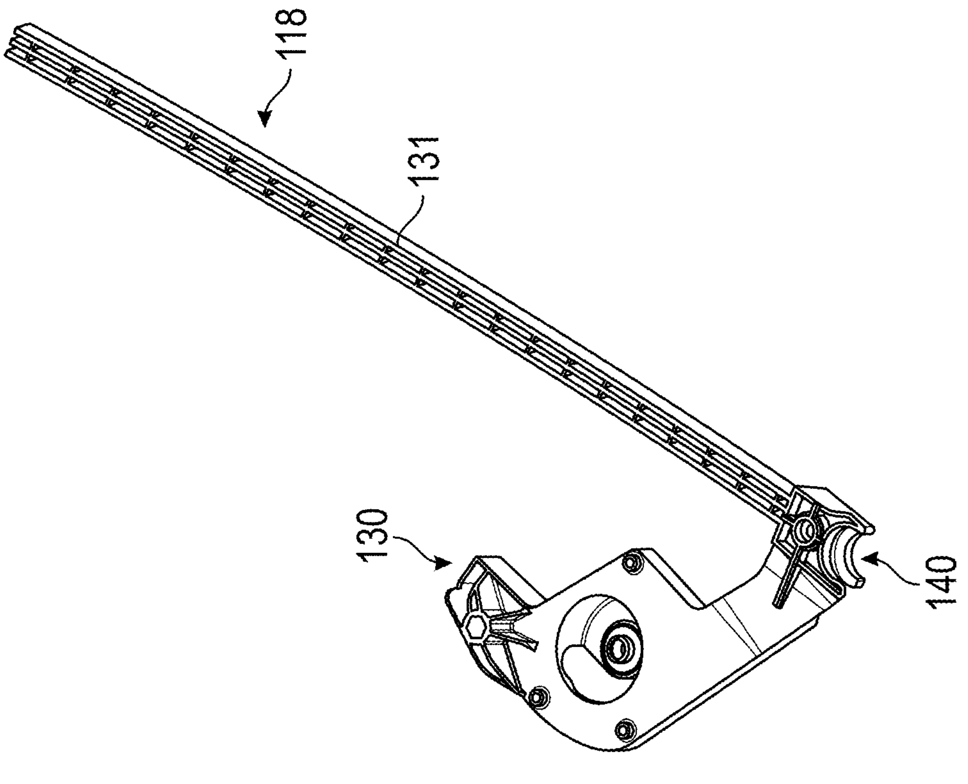
Figure 7A:
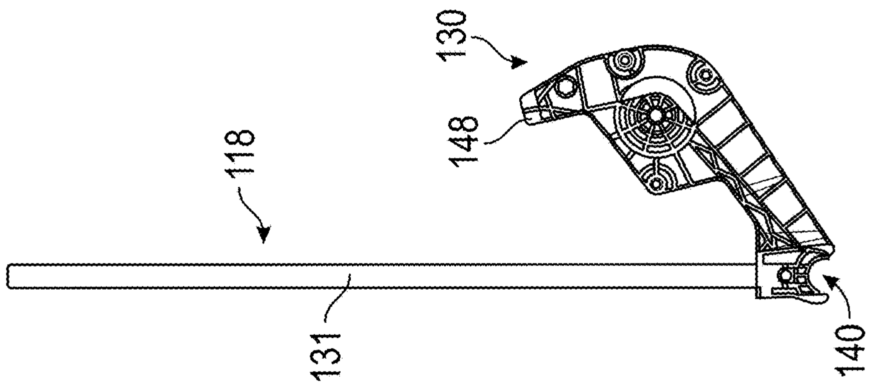
FIGS. 7A and 7B are views of a guide rail with an integral housing or flange portion formed as a single unitary structure.
Figure 7B:
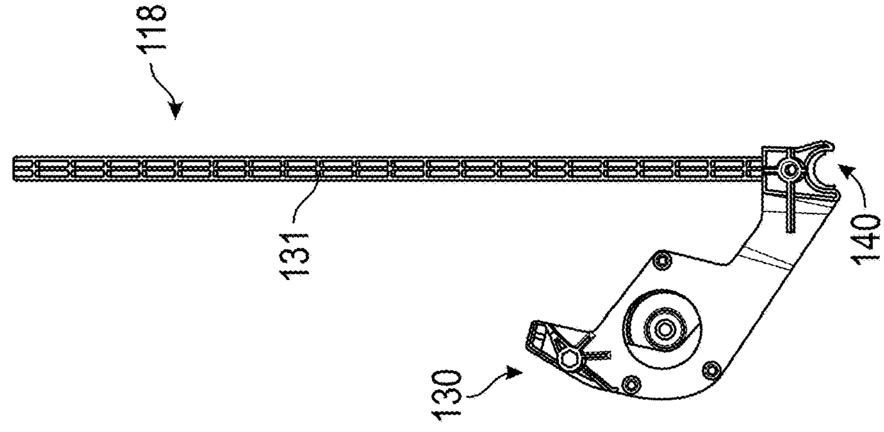
Figure 8:
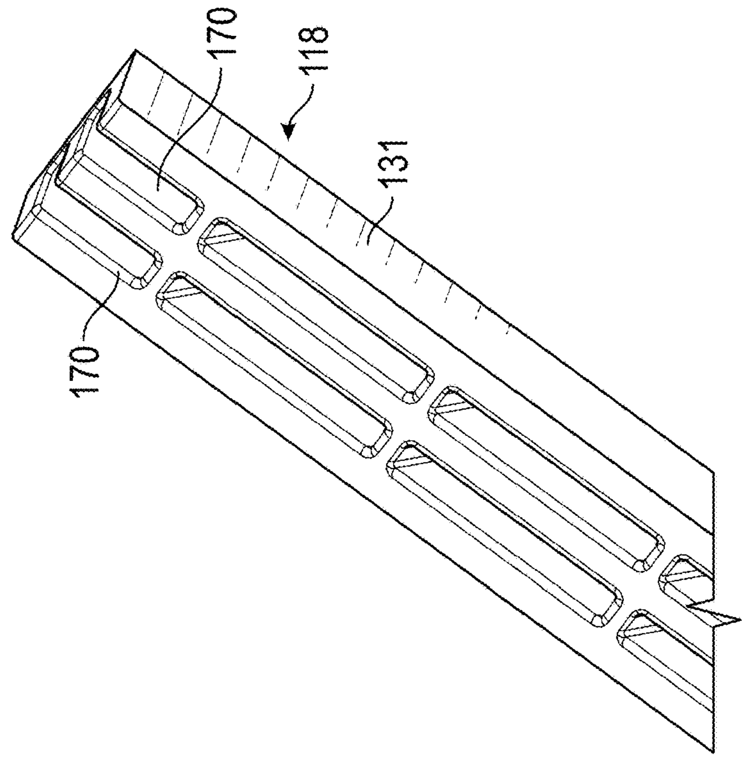
FIG. 8 is a view of a portion of the guide rail illustrated in FIGS. 6A-7B.
Figure 10:
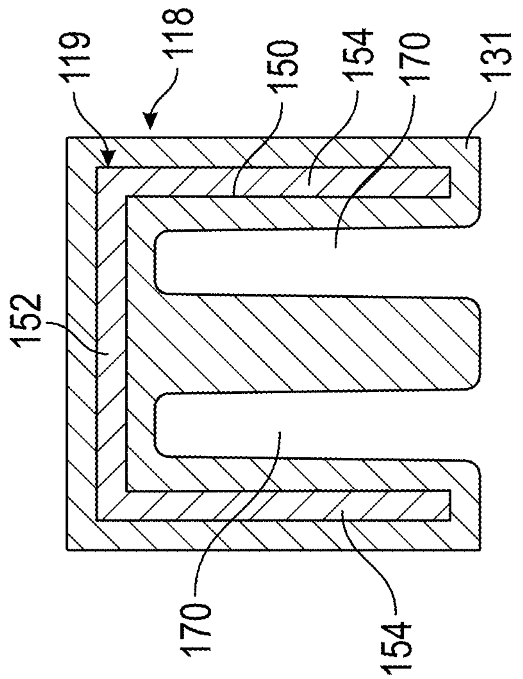
FIG. 10 is a view along lines 10-10 of FIG. 9.
Figure 9:
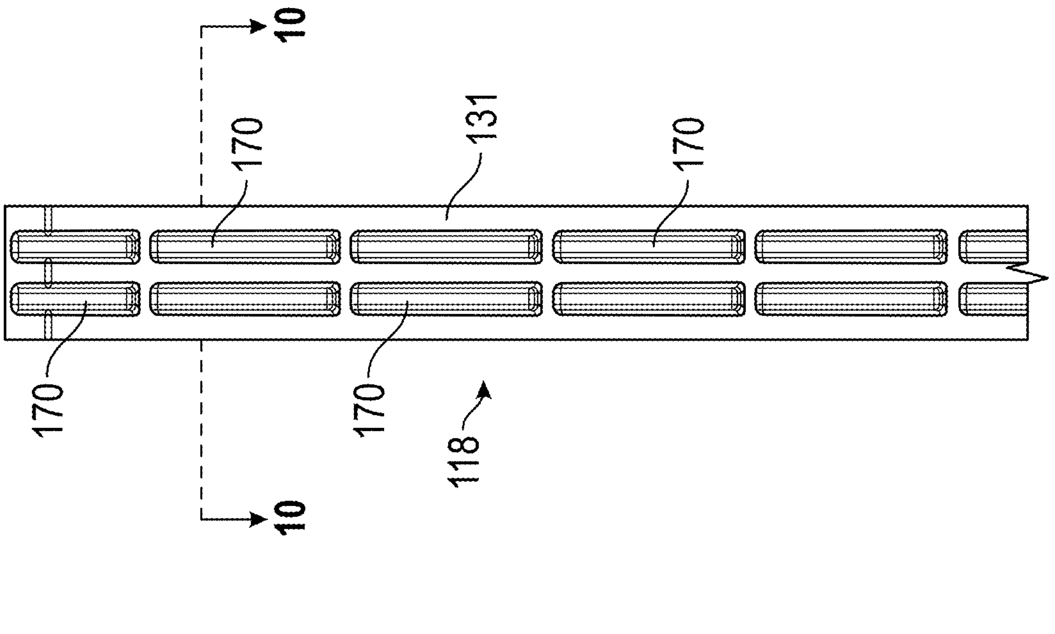
FIG. 9 is a view of a portion of the guide rail illustrated in FIGS. 6A-7B.

In order to provide structural rigidity to the guide rail 18 illustrated in FIG. 4A, the guide rail 18 is insert molded onto or with the housing or flange portion 30 (e.g., the guide rail 18 is inserted into a mold that forms the housing or flange portion 30) and the housing or flange portion 30 has a structural member 58 that extends into cavity 50.

Referring now to FIGS. 5A-5E various configurations of the structural member 58 are illustrated.

In yet another alternative, the guide rail 18 with the structural member 58 is separately formed with an insert molding process and the housing or flange portion 30 is also separately formed and then once formed the housing or flange portion 30 is subsequently secured to the guide rail 18 with the structural member 58.

In the embodiment, where the guide rail 18 is insert molded onto or with the housing or flange portion 30 at least one end of the guide rail 18 has to be open to allow the cursor 20 to be slid on guide rail 18. In one embodiment the housing or flange portion 30 is insert molded onto the guide rail. In this embodiment, the housing or flange portion 30 may include a structural member 58 that is molded into cavity 50 of the guide rail formed as a three sided structure. In yet another alternative, the housing or flange portion 30 may be separately formed and separately secured to the guide rail 18.

In still yet another alternative, the housing or flange portion 30 may be secured to an upper portion of the guide rail (e.g., the portion closest to the window opening in the door when the guide rail 18 is secured to the vehicle door) as opposed to the bottom portion. In this embodiment, the housing or flange portion 30 may employ any of the aforementioned configurations or embodiments (e.g., insert molding with or without structural member 58 and either to an enclosed structure (with or without structural ribs 39) or an open channel structure or to separately formed and secured to the guide rail 18).

When a cursor 20 is used that has a portion that completely surrounds the guide rail 18 and the housing or flange portion 30 is secured to the lower end or upper end of the guide rail 18, the opposite end of the guide rail 18 has to be open so that the cursor 20 can be slid on the guide rail 18 and thereafter a housing or feature 26 is secured to the opposite end (e.g., bottom or top) after the cursor 20 is slid onto the guide rail 18. As mentioned above, the housing or feature 26 is configured to rotationally receive a pulley 24 or is formed to have a cam feature 24 for guiding the cable 22 therethrough.

Alternatively and in some of the aforementioned embodiments the cursor 20 may be only configured to ride or slide on three sides of the guide rail. In these embodiments, the cursor 20 can be snap fitted onto the guide rail 18. As such, there may be no need to leave one of the ends of the guide rail 18 open. This is particularly advantageous in the embodiments where the structural member 58 is insert molded into the guide rail 10.

Referring now to FIGS. 6A-10 yet another alternative embodiment of the present disclosure is illustrated. Here the guide rail 118 for use with a motor, cables, cursor, pulleys and associated components in order to provide a window regulator is formed as single unitary structure with the a housing or flange portion 130. The housing or flange portion 130 is configured to support a motor and associated cable drum such that the motor is located at a side of the guide rail 118. The housing or flange portion 130 may also be configured to have a cable guide(s) 148 that are configured to guide cable(s) as they are wound and unwound from the cable drum 28.

In this embodiment a three sided structural member 119 having an opening or channel 150 such as a substantially "C" or "U" shaped configuration when viewed from an end or in a cross-sectional view is insert molded with an exterior plastic material 131 such that when completely formed by the insert molding process the exterior plastic material 131 forms an exterior surface of the guide rail 118 upon which the cursor will slide. The three sided structural member 119 may have a bottom portion 152 with a pair of integrally formed opposing sidewalls 154 that define opening or channel 150. The three sided structural member 119 may be formed from a metal such as aluminum, steel, metallic alloys or from a plastic material, or a plastic composite material that is capable of being insert molded.

As such, the three sided structural member 119 can provide additional structural reinforcement and rigidity to the guide rail 118.

In one non-limiting embodiment, the exterior plastic material located within opening or channel 150 may have open areas 170 to reduce the required material for the exterior plastic material 131.

In FIGS. 6A, 6B, 7A and 7B it is understood that the housing or flange portion 130 may be located at either the top or bottom of the guide rail 118 when it is secured to the vehicle door 12. Also illustrated is a feature 140 that is configured to rotationally receive a pulley.

Figure 11:
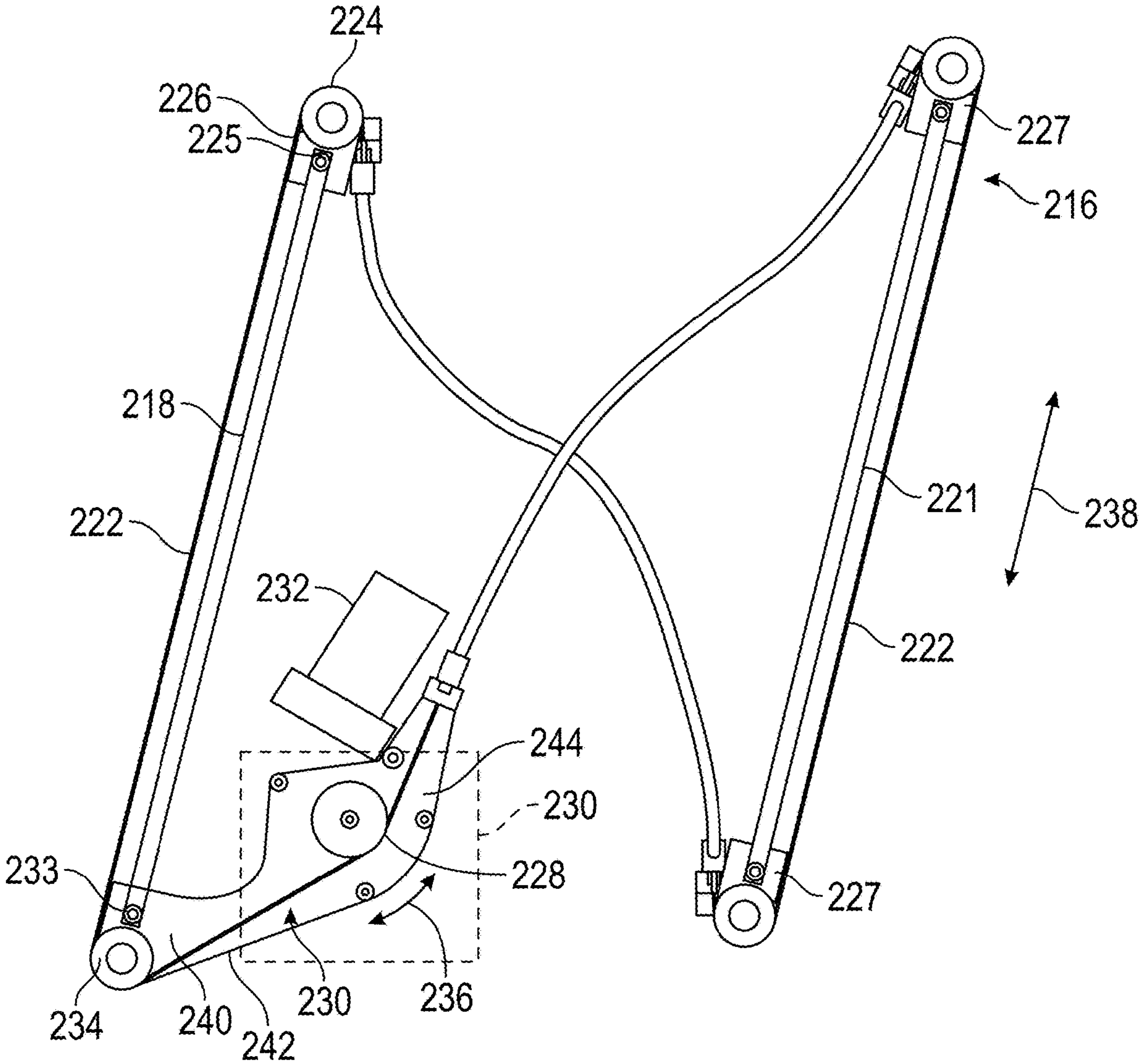
FIG. 11 illustrates a dual channel window regulator in accordance with an embodiment of the present application.

Referring now to FIG. 11 a schematic view of a dual channel window regulator 216 is provided. In this embodiment, the window regulator 216 includes a first or forward guide rail 218 and a second or rear guide rail 221. As used herein, the first or forward guide rail 218 is located closer to a forward end of a vehicle than the second or rear guide rail when the window regulator 216 is secured to a door of the vehicle (illustrated in FIG. 1).

Each guide rail 218, 221 has a cursor 220 (FIGS. 12-15) that is slidably secured to the guide rails 218, 221. In FIG. 11, the window regulator 216 is illustrated without the cursors 220.

The cursor 220 is configured to be secured to the window 14 and is operably coupled to a cable 222 or cables 222 that are secured to the cursor 220. The first or forward guide rail 218 has an upper pulley or upper cam 224 that is secured to a top portion or top end 225 of the first or forward guide rail 218 by a housing or feature 226. As illustrated, the upper pulley or upper cam 224 is aligned with the first or forward guide rail 218. In the event a pulley is used, the upper pulley 224 is rotationally received in the housing or feature 226. The upper pulley or upper cam is configured to receive either rotationally or slidably cable 222. The cable or cables 222 are secured to the cursor 220 at one end and a cable drum 228 at an opposite end.

The cable drum 228 is rotationally mounted to a housing or flange portion 230. In order to provide rotational movement to the cable drum 228, a motor 232 is operably coupled to the cable drum 228 by for example a worm drive (not shown) that is rotated by the motor 232. The housing or flange portion 230 is secured to a bottom portion or bottom end 233 of the first or forward guide rail 218. As used herein, the top end 225 of the first or forward guide rail 218 is located closer to a top of the vehicle door 12 (FIG. 1) than the bottom end 233 when the window regulator 216 is secured to the vehicle door 12.

The housing or flange portion 230 also has a lower pulley or lower cam 234 secured to the housing. In the event a pulley is used, the lower pulley 234 is rotationally received in the housing 230. As illustrated, the lower pulley or lower cam 234 is aligned with the first or forward guide rail 218. The lower pulley or lower cam 234 is configured to rotationally or slidably received cable 222.

As mentioned above, a cable 222 or a pair of cables 222 are secured to the cable drum 228 and the cursors 220. In the event, a pair of cables 222 are employed one of the pair of cables 222 is secured to one of the cursors 220 at one end and the cable drum 228 at the other end and the other one of the cables 222 is secured to other one the cursors 220 at one end and the cable drum 228 at the other end.

As the cable drum 228 is rotated in the direction of arrows 236 one of the cables 222 (when two are used) will wind up on the cable drum 228 while the other unwinds thus causing movement of the cursors 220 in the directions of arrows 238. Movement of the cursor in the directions of arrows 238 will cause the window 14 to move up and down with respect to the vehicle door 12. In the event a single cable 222 is used a portion of the cable will wind on cable drum 228 while another portion will unwind from the cable drum 228 in order to provide the desired movement of the cursors 220 in the direction of arrows 238.

In one non-limiting embodiment, the first or forward guide rail 218 and the second or rear guide rail 221 are a hollow tube or structure formed from a metal such as aluminum, steel, metallic alloys or the hollow tube formed from a plastic material, or a plastic composite material. In one alternative and as illustrated in at least FIG. 3, the first or forward guide rail 218 and the second or rear guide rail 221 is an extruded structure that has internal structural features, supports or ribs 39 that extend across a cavity 41 of the guide rail. In this embodiment the internal structural features, supports or ribs 39 extend from an interior surface of the wall or walls that define an exterior surface of the first or forward guide rail 218 and the second or rear guide rail 219. The exterior surface being opposite to the interior surface of the wall or walls.

In addition and in one non-limiting embodiment, the housing or flange portion 230 and the housing or feature 226 are formed from an easily molded material such as a plastic material, metal insert reinforced plastic or a plastic composite material. Alternatively, the first or forward guide rail 218 and the second or rear guide rail 221 may be solid. In various embodiments of the present disclosure, the guide rails 218, 221 may have a square or rectangular configuration or periphery.

Not shown are a controller for controlling the motor 232 and inputs to the controller such as user operated switches and a vehicle control module that may also provide input to the controller. Also not shown is an electric power supply system, which may include a battery and alternator as vehicle electric power supply systems and window controllers are well known in the art, these components are not discussed in further detail.

In one embodiment, the cursors 220 or a portion thereof is configured to completely surround a periphery of the first or forward guide rail 218 and the second or rear guide rail 221. As such, the portion of the cursors 220 surrounding the first or forward guide rail 218 and the second or rear guide rail 221 will have multiple contact points with the guide rail in order to prevent undesired twisting, rotation or movement of the cursor as it slides up and down the first or forward guide rail 218 and the second or rear guide rail 221 in the direction of arrows 238. In being understood, that some minor rotation, movement or twisting of the cursor 220 about an axis (extending generally in the direction of arrows 238) of the guide rails 218, 221 is acceptable for operation of the window regulator.

The housing or flange portion 230 is configured to be mounted to the bottom portion or bottom end 233 of the first or forward guide rail 218 and motor 232 is secured to the bottom portion or bottom end 233 of the first or forward guide rail 218 via the housing or flange portion 230 as opposed to a bottom mount motor where the motor is mounted to the bottom of the first or forward guide rail 218 and the cable drum of the motor assembly is the pulley located at the bottom of the first or forward guide rail 218. Since a bottom mount motor is typically located at the end 233 of the first or forward guide rail 218 the motor 232 and its housing may inhibit the movement of the cursor 220 and thus the movement of the window 14.

In accordance with the present disclosure and in order mount the motor 232 to the end 233 of the first or forward guide rail 218 the housing or flange portion 230 is configured to have a rail mounting portion 240 that engages the end 233 of the first or forward guide rail 218 while an arm portion 242 extends from the rail mounting portion 240 in a direction away from the first or forward guide rail 218 such that the motor 232 when mounted to the housing or flange portion 230 is located adjacent to a side of the first or forward guide rail 218. As such, when the motor 232 is mounted to the housing or flange portion 230 the motor 232 is located adjacent to a side of the first or forward guide rail 218 located between the bottom end 233 of the first or forward guide rail 218 and a top end 225 of the first or forward guide rail 218. In one embodiment, the arm portion 242 extends laterally and upwardly towards the top end 225 of the first or forward guide rail 218 from the bottom end 233 of the first or forward guide rail 218.

In one embodiment, the motor 232 can be orientated to extend in a direction generally parallel to the first or forward guide rail 218 in order to reduce the required real estate for the window regulator 216 when it is installed in a vehicle door 12. Alternatively, the motor 232 need not be parallel to the first or forward guide rail 218 as long as it is located at a side of the first or forward guide rail 218 so as to avoid the limited applications of traditional bottom mount motor systems which have limited applications due to glass drop limitations with packaging a motor at the bottom of the rail.

The housing or flange portion 230 also has a mounting portion 244 extending from the arm portion 242. The mounting portion 244 is configured to have the motor 232 mounted thereto and also includes a housing configured to rotationally receive the cable drum 228.

The housing or flange portion 230 may also have cable guides that are configured to guide cable(s) 222 as they are wound and unwound from the cable drum 228.

In one embodiment, the housing or flange portion 230 is formed as a single piece such that the rail mounting portion 240, the arm portion 242, the mounting portion 244 and the housing are all formed together as a single component (e.g., they are all formed as a single piece by for example an injection molding or casing process). As such and when the rail mounting portion 240, the arm portion 242, the mounting portion 244 and the housing or any combination thereof are referred to as being integrally formed it is understood that the housing or flange portion 230 they will be all formed together as a single component (e.g., they are all formed as a single piece).

In an alternative embodiment, the housing or flange portion 230 may be secured to the second or rear guide rail 221. In yet another alternative embodiment, the housing or flange portion 230 may not be secured to any guide rail and be floating with respect to the guide rails 218, 221 and can be independently installed to the vehicle door into which the window regulator is installed. This embodiment is illustrated by the dashed lines 230 in FIG. 11. In the this embodiment, the dual channel window regulator 216 with an independent or floating housing or flange portion 230 may be used with any combination of the guide rail and cursor configurations illustrated herein. In addition and in this embodiment where an independent or floating housing or flange portion 230 is used with a dual channel window regulator 216, a feature is secured to the bottom end of the first or front guide rail 218. This feature would be configured to rotationally receive pulley 234 or have a cam feature 234 for guiding the cable 222. In one embodiment, this feature may be similar to feature 227 secured to the top of the second or rear guide rail 221.

In yet another alternative embodiment, the first or forward guide rail 218 and/or the second or rear guide rail 221 may be a three sided structure with an opening or channel 50 such as a substantially "C" or "U" shaped configuration when viewed from an end or in a cross-sectional view. See for example, FIGS. 4A and 4B wherein the illustrated guide rail has a bottom portion 52 with a pair of integrally formed opposing sidewalls 54 that define opening or channel 50. In one alternative embodiment, the pair of integrally formed opposing sidewalls 54 each have a lip portion 56. Alternatively, the pair of integrally formed opposing sidewalls 54 are straight and do not have a lip portion 56. In one embodiment, the guide rail illustrated in FIG. 4A is formed as a single unitary piece that may be formed from a metal such as aluminum, steel, metallic alloys or the guide rail is formed from a plastic material, or a plastic composite material.

In order to provide structural rigidity to the guide rail illustrated in FIG. 4A, the guide rail is insert molded onto or with the housing or flange portion 230 (e.g., the guide rail is inserted into a mold that forms the housing or flange portion 230) and the housing or flange portion 230 has a structural member 58 that extends into cavity 50.

Referring now to FIGS. 5A-5E various configurations of the structural member 58 are illustrated.

In yet another alternative, the guide rail with the structural member 58 is separately formed with an insert molding process and the housing or flange portion 230 is also separately formed and then once formed the housing or flange portion 230 is subsequently secured to the guide rail with the structural member 58.

In the embodiment, where the guide rail is insert molded onto or with the housing or flange portion 230 at least one end of the guide rail has to be open to allow the cursor 220 to be slid on the guide rail. In one embodiment the housing or flange portion 230 is insert molded onto the guide rail. In this embodiment, the housing or flange portion 230 may include a structural member 58 that is molded into cavity 50 of the guide rail formed as a three sided structure. In yet another alternative, the housing or flange portion 230 may be separately formed and separately secured to the guide rail.

In still yet another alternative, the housing or flange portion 230 may be secured to an upper portion of the guide rail (e.g., the portion closest to the window opening in the door when the guide rail is secured to the vehicle door) as opposed to the bottom portion. In this embodiment, the housing or flange portion 230 may employ any of the aforementioned configurations or embodiments (e.g., insert molding with or without structural member 58 and either to an enclosed structure (with or without structural ribs 39) or an open channel structure or to separately formed and secured to the guide rail).

When a cursor 220 is used that has a portion that completely surrounds the guide rail 218, 221 and the housing or flange portion 230 is secured to the lower end or upper end of the guide rail 218, 221, the opposite end of the guide rail 218 has to be open so that the cursor 220 can be slid on the guide rail 218, 221 and thereafter a housing or feature 226 is secured to the opposite end (e.g., bottom or top) after the cursor 220 is slid onto the guide rail. As mentioned above, the housing or feature 226 is configured to rotationally receive a pulley 224 or is formed to have a cam feature 224 for guiding the cable 222 therethrough.

Alternatively and in some of the aforementioned embodiments the cursor 220 may be only configured to ride or slide on three sides of the guide rail 218, 221. In these embodiments, the cursor 220 can be snap fitted onto the guide rail 218, 221. As such, there may be no need to leave one of the ends of the guide rail 218, 221 open. This is particularly advantageous in the embodiments where the structural member 58 is insert molded into the guide rail 218, 221.

In yet another embodiment, guide rails 218, 221 of the dual channel window regulator 216 may be formed in accordance with the embodiments depicted in FIGS. 6A-10.

In one embodiment, the housing or feature 226 of the first or forward guide rail 218 is similar to housing or features 227 used at the top and bottom of the second or rear guide rail 221. In one embodiment, the housing or feature 226 of the first or forward guide rail 218 can be identical to the housing or feature 227 used at the bottom of the second or rear guide rail 221. In addition and in one embodiment, the housing or feature 227 used at the top of the second or rear guide rail 221 is a mirror image of the housing or feature 226 of the first or forward guide rail 218.

Referring now to FIGS. 12-15, a cursor 220 contemplated for use with any of the aforementioned embodiments disclosed in the present application is illustrated. In the dual channel window regulator 216 embodiment, the cursor 220 used with the first or forward guide rail 218 and the second or rear guide rail 221 has the same configuration such that the rear rail cursor 220 can be used on the front rail and vice versa, this allows for the least amount of changes for the cursor design.

Figure 12:
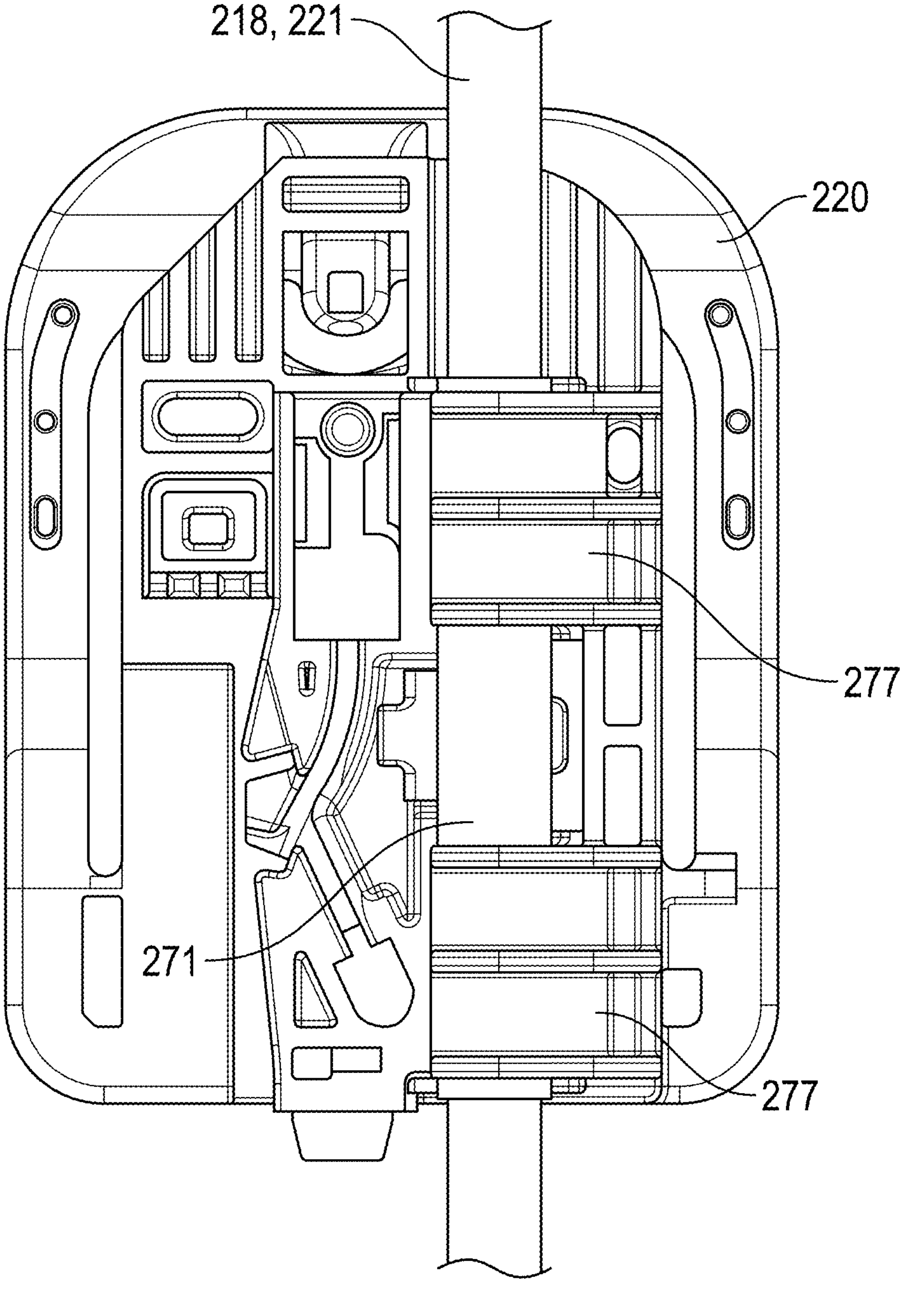
FIG. 12 illustrates the placement of a cursor on a window regulator in accordance with an embodiment of the present application.
Figure 14:
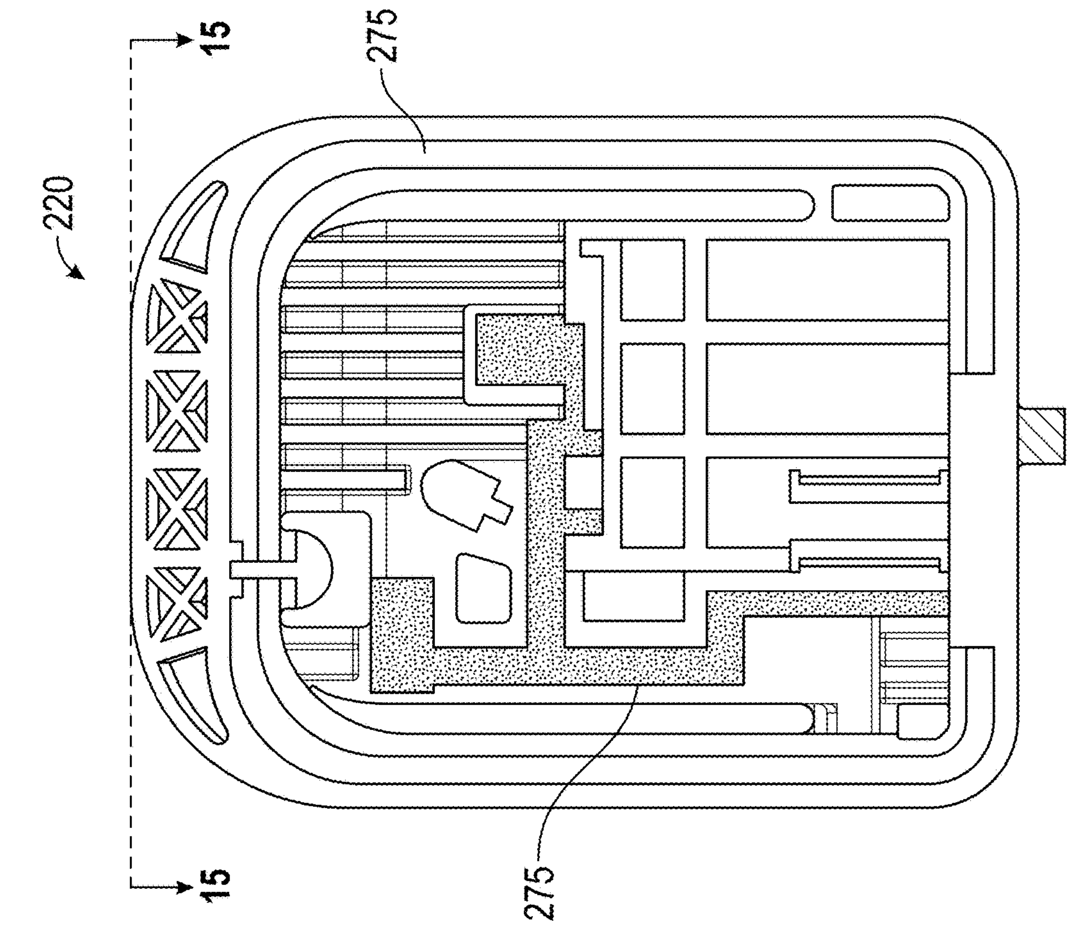
FIG. 14 is a view along lines 14-14 of FIG. 13.
Figure 13:
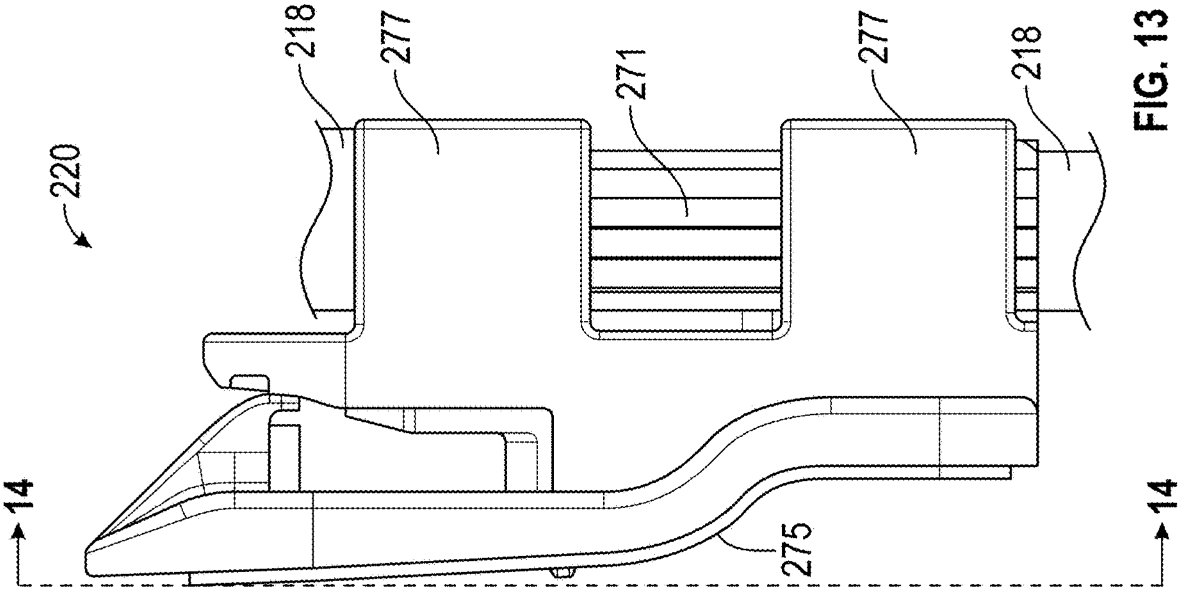
FIG. 13 is a side view of cursor for use with window regulators in accordance with an embodiment of the present application.
Figure 15:
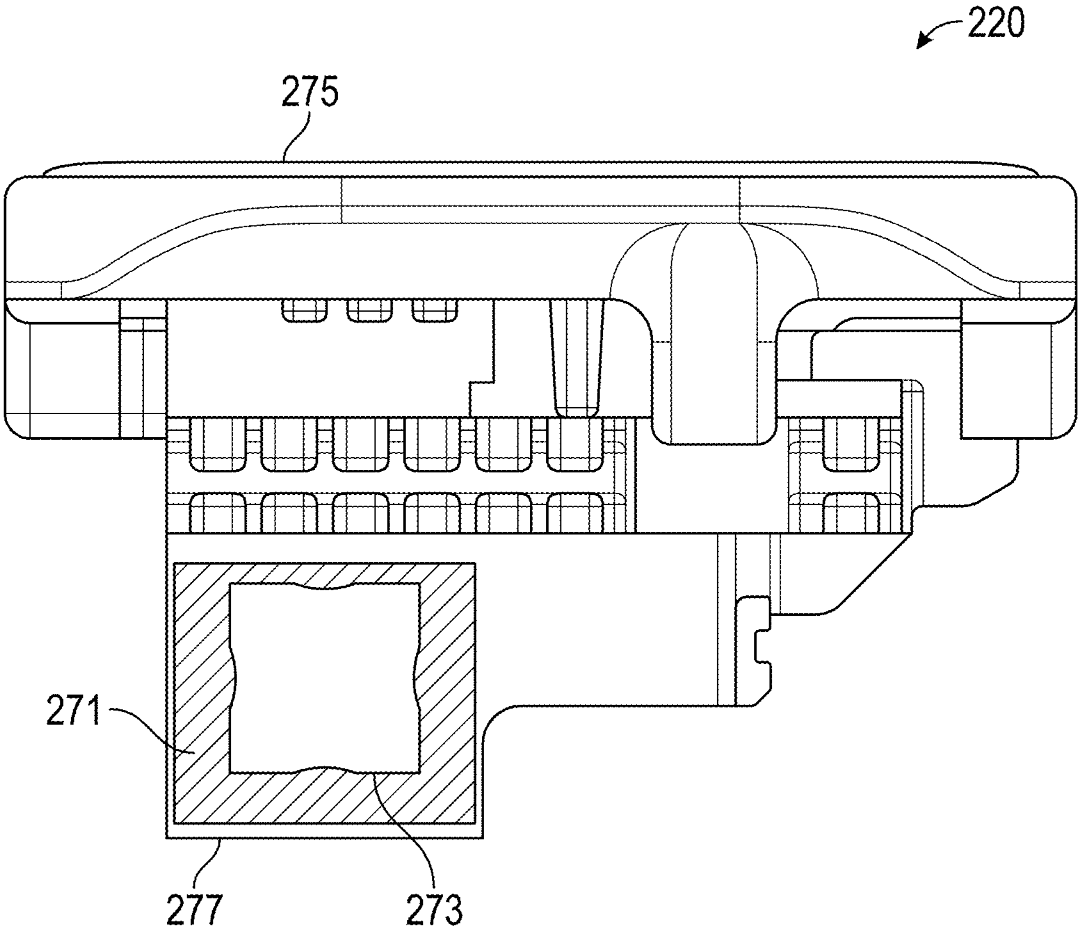
FIG. 15 is view along lines 15-15 of FIG. 14.

FIG. 12 illustrates the approximate rail (218, 221) placement through cursor 220. Referring now to FIGS. 12-15, the cursor 220 is configured to have a polyoxymethylene (POM) insert 271 that defines an opening 273 for the guide rail 218, 221 to slide therethrough. In one embodiment, the cursor 220 is over- molded onto the polyoxymethylene (POM) insert 271. In one embodiment, the cursor is a nylon cursor over-molded onto the polyoxymethylene (POM) insert 271. In yet one other embodiment, the cursor(s) 220 are formed from an easily molded material such as a plastic material. Still further, the cursor(s) 220 can be formed with a thermoplastic elastomer (TPE) over-mold 275.

The cursor 220 may be configured to have a feature or two or multiple separate features 277 over-molded onto the polyoxymethylene (POM) insert 271. Alternatively, the cursor(s) 220 may be separately formed and the polyoxymethylene (POM) insert 271 may be separately formed and the polyoxymethylene (POM) insert 271 is slid into the feature(s) 277.

The present disclosure is directed to a window regulator configured to use with a frameless door assembly for an automotive vehicle. As such, the window of the frameless door assembly has no frame surrounding the top and upper side portions of the window as it sides up and down and when it is in a closed position (e.g., fully extended from a sill of the vehicle door).

Figure 16:
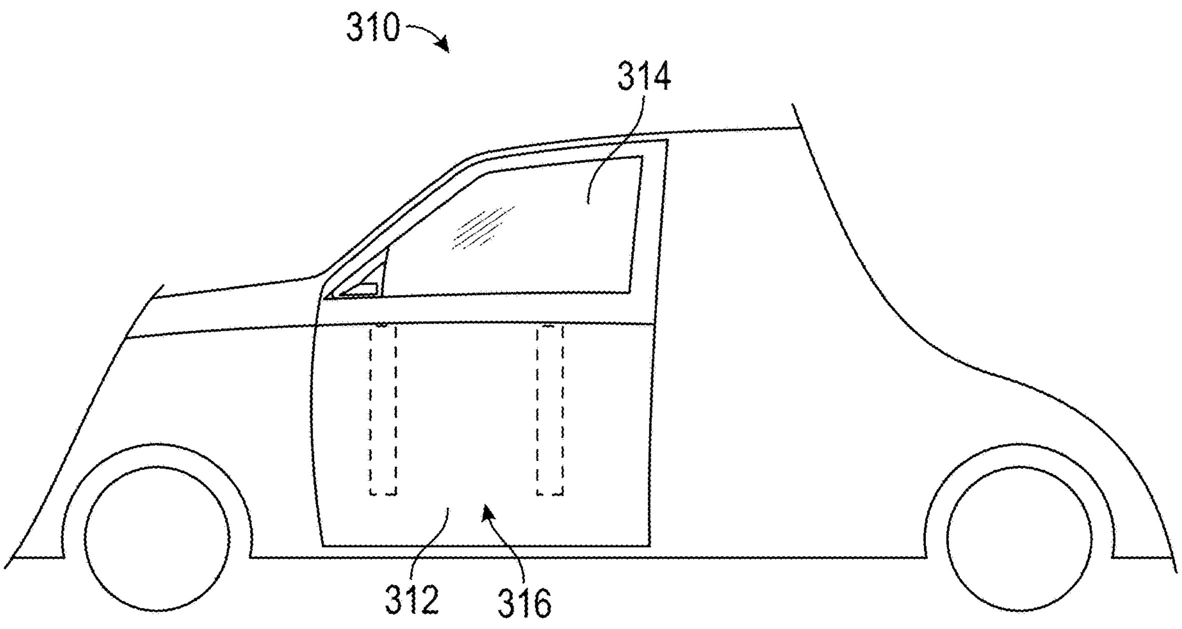
FIG. 16 is a partial view of a vehicle having a window regulator according to the present disclosure.

Referring now to FIG. 16 is a partial side view of a vehicle 310 having at least one door 312 with a window 314 that is configured to be raised and lowered by a window regulator 316 disposed within door panels (e.g., exterior and interior) of the door 312. Although, only one door 312 and window 314 is illustrated it is contemplated that the window regulator or the present disclosure can be used in a vehicle having numerous doors and associated windows. As such, one or more other windows 314 of the vehicle 310 may also be operated by a window regulator 316 according to the present disclosure.

Figure 17A:
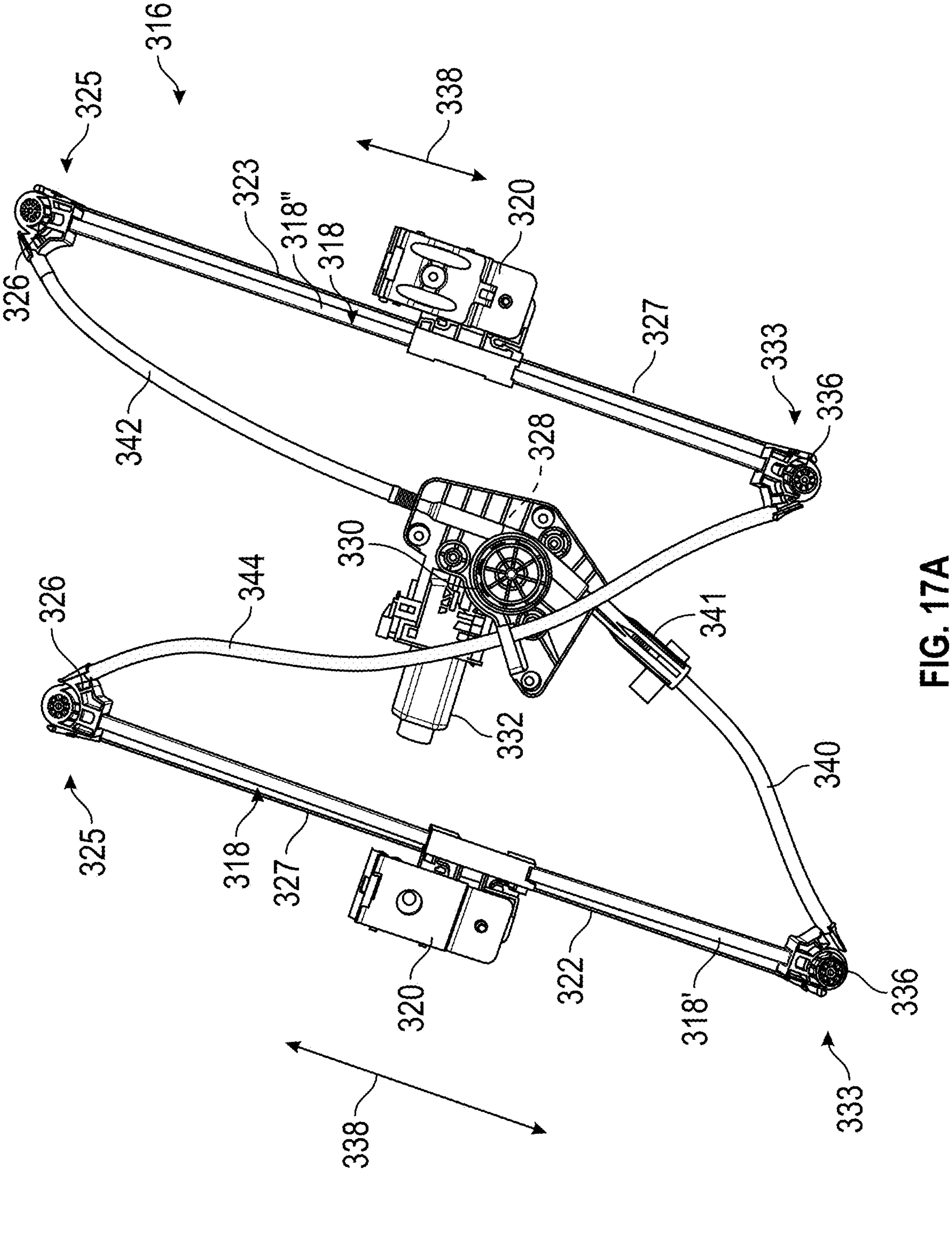
FIG. 17A is a front perspective view of a window regulator according to the present disclosure.
Figure 17B:
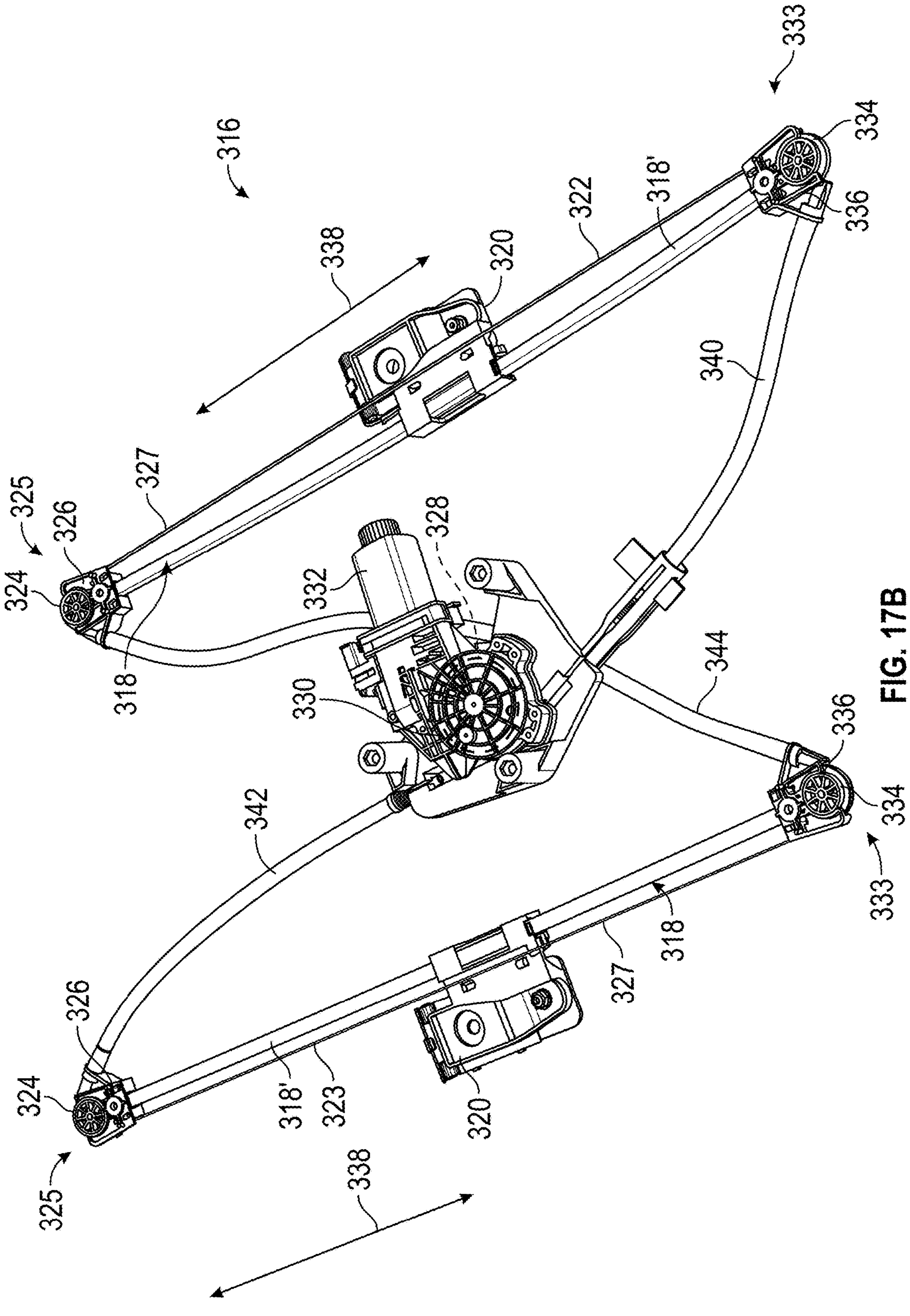
FIG. 17B is a rear perspective view of a window regulator according to the present disclosure.
Figure 18:
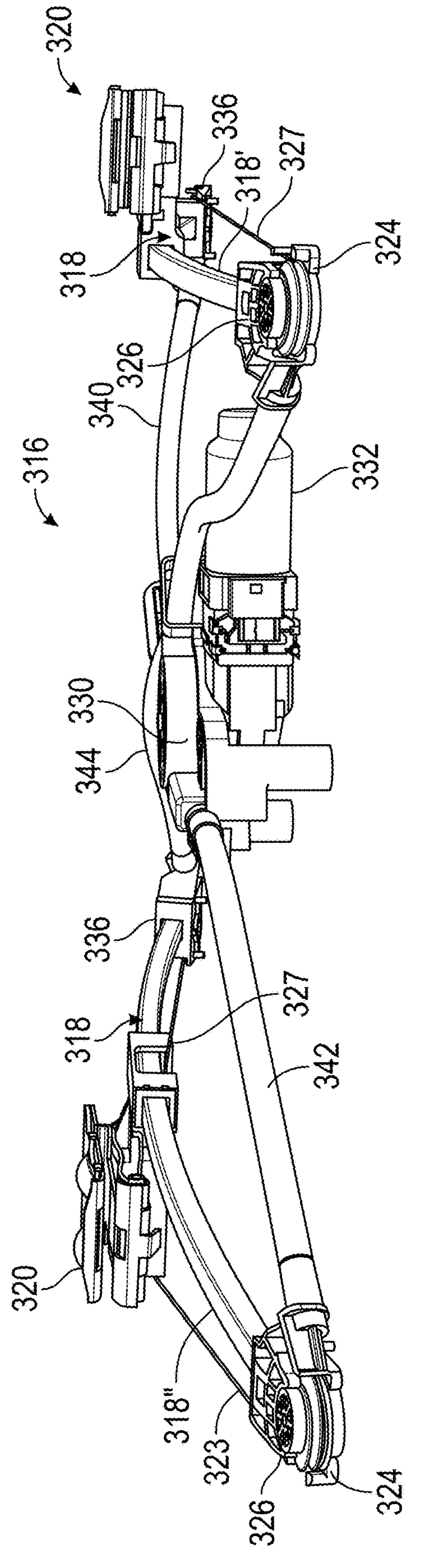
FIG. 18 is a top perspective view of a window regulator according to the present disclosure.
Figure 19:
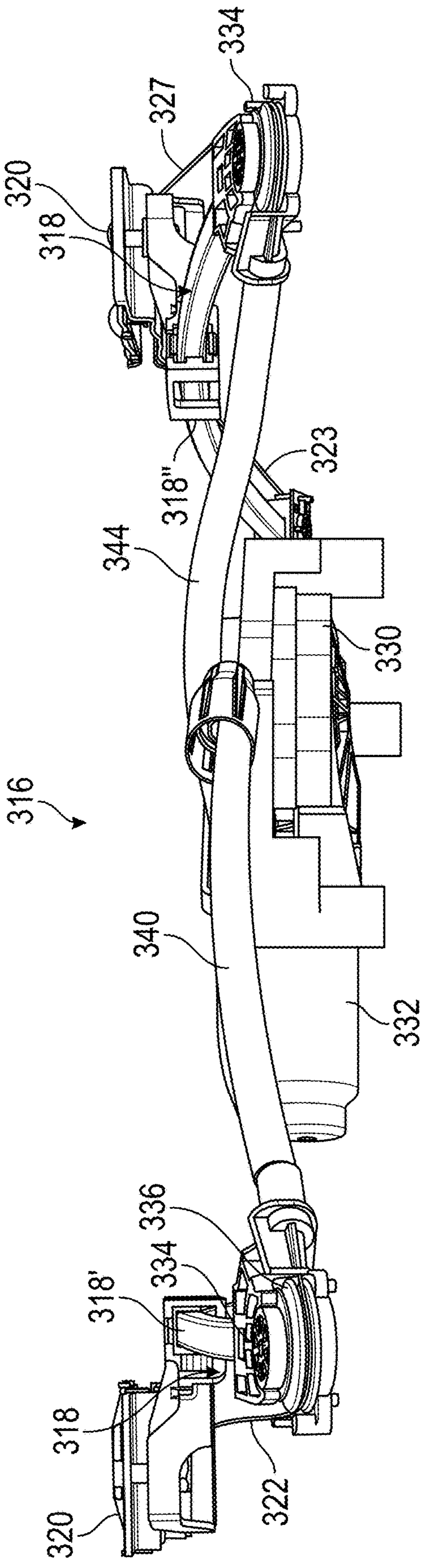
FIG. 19 is a bottom perspective view of a window regulator according to the present disclosure.

In FIGS. 17A and 17B perspective views of the window regulator 316 are illustrated. The window regulator 316 includes a pair of guide rails 318 each having a cursor 320 that is slidably secured to a respective guide rail 318 of the pair of guide rails 318. The pair of guide rails 318 may be referred to as a first guide rail 318' and a second guide rail 318". In the illustrated embodiment, the first guide rail 318' is located closer a forward portion of the vehicle or vehicle door than the second guide rail 318" when the window regulator 316 is secured to the vehicle door. As such, the second guide rail 318" is located closer a rear portion of the vehicle or vehicle door than the first guide rail 318' when the window regulator 316 is secured to the vehicle door. In addition, the corresponding cursor may be referred to as a first cursor 320 and a second cursor 320. Each cursor 320 is configured to be secured to the window 314 and each cursor 320 is operably coupled to a pair of cables.

Each one of the pair of guide rails 318 of the window regulator 316 has an upper pulley or upper cam 324 that is secured to a top portion or top end 325 of each guide rail 318 by a housing or feature 326. As illustrated, the upper pulley or upper cam 324 is aligned with the guide rail 318. In the event a pulley is used, the upper pulley 324 is rotationally received in the housing or feature 326. The upper pulley or upper cam is configured to receive either rotationally or slidably a cable. For example, a first cable 322 is secured to one of the pair of cursors 320 at one end and a cable drum 328 at an opposite end and a second cable 323 is secured to the other one of the pair of cursors 320 at one end and the cable drum 328 at an opposite end. In addition, a third cable 327 is secured to one of the pair of cursors 320 at one end and the other one of the pair of cursors 320 at an opposite end.

The cable drum 328 is rotationally mounted to a housing 330. In order to provide rotational movement to the cable drum 328, a motor 332 is operably coupled to the cable drum 28 by for example a worm drive (not shown) that is rotated by the motor 332. In one embodiment, the housing 330 is not secured either guide rail 318 such that it is free floating with respect to the guide rails 318. In yet another alternative embodiment, the housing 330 may be secured to the top end 325 of either the first guide rail 318' or the second guide rail 318". As used herein, the top end 325 of the guide rail 318 is located closer to a top of the vehicle door 312 than a bottom end 333 of the guide rail 318 when the window regulator 316 is secured to the vehicle door 312. Still further and in yet another alternative embodiment, the housing 330 is secured to the bottom end 333 of the second guide rail 318". However and as will be discussed below, in any of the above embodiments the housing 330 is not secured to the bottom end 333 of the first or forward guide rail 318'.

The guide rails 318 also have a lower pulley or lower cam 334 secured to a housing or feature 336 that is secured to the bottom end 333 of the guide rail 318. In the event a pulley is used, the lower pulley 334 is rotationally received in the housing or feature 336. As illustrated, the lower pulley or lower cam 334 is aligned with the guide rail 318. The lower pulley or lower cam 334 is configured to rotationally or slidably received one of the cables.

As mentioned above, a first cable 322 is secured to one of the pair of cursors 320 at one end and a cable drum 328 at an opposite end and a second cable 323 is secured to the other one of the pair of cursors 320 at one end and the cable drum 328 at an opposite end. In addition, a third cable 327 is secured to one of the pair of cursors 320 at one end and the other one of the pair of cursors 320 at an opposite end.

As the cable drum 328 is rotated either the first cable 322 or second cable 323 will wind up on the cable drum 328 while the other unwinds thus causing movement of the cursor 320 in the directions of arrows 338. In addition, cable 327 which is not connected to the cable drum 328 will move accordingly. For example, the cable 327 is attached to a top portion of one cursor 320 at one end and a bottom portion of the other cursor 320 at its opposite end. Movement of the cursors 320 in the directions of arrows 338 will cause the window 314 to move up and down with respect to the vehicle door 312.

The window regulator 316 also includes a first cable sheath 340 for the first cable 322 that extends from the housing or feature 336 of the first or forward guide rail 318' to the housing 330. In addition, a second cable sheath 342 extends from the housing 330 to the housing or feature 326 of the second or rear guide rail 318". Still further, a third cable sheath 344 extends from a housing or feature 336 of the second or rear guide rail 318" and the housing or feature 326 of the first or forward guide rail 318'. As mentioned above, the first guide rail 318' is a forward guide rail 318 and the second guide rail 318" is a rearward guide rail. As used herein forward guide rail 318 means the guide rail 318 of the pair of guide rails 318 that is closer to a forward portion of the vehicle 310 when the window regulator 316 is secured to the vehicle and the rearward guide rail 318 means the guide rail 318 of the pair of guide rails that is closer to a rearward portion of the vehicle when the window regulator 316 is secured to the vehicle 310.

The first cable 322 is slidably received within the first cable sheath 340, and the second cable 323 is slidably received in the second cable sheath 342, and the third cable 327 is slidably received in the third cable sheath 344. These cables 322, 323 and 327 and their associated cable sheaths 340, 342, and 344 are referred to as Bowden cables. The first cable sheath 340 also includes an irreversible tensioner or spring tensioner 341 such that slack in the first cable 322 is absorbed as is known in the related arts. One non-limiting example of an irreversible tensioner 341 is described in U.S. Pat. No. 8,555,549, the entire contents of which are incorporated herein by reference thereto. As such, the first cable 322 may be referred to as a slack side cable and thus the housing 330 is not be secured to the bottom end 333 of the first or forward guide rail 318' such that the irreversible tensioner 341 can be associated with the first cable 322.

In one non-limiting embodiment, the guide rails 318 are hollow tubes or structures formed from a metal such as aluminum, steel, metallic alloys or the hollow tube formed from a plastic material, or a plastic composite material. In one alternative, the guide rails 318 are extruded structures that have internal structural features, supports or ribs that extend across a cavity of the guide rail. In this embodiment the internal structural features, supports or ribs extend from an interior surface of the wall or walls that define an exterior surface of the guide rail 18. The exterior surface being opposite to the interior surface of the wall or walls. Examples of such guide rails 318 are found in the following U.S. patent application Ser. No. 17/514,865 filed on Oct. 29, 2021 and U.S. Provisional Patent Application Ser. No. 63/166,777 filed on Mar. 26, 2021 the contents each of which are incorporated herein by reference thereto.

In accordance with one embodiment of the present disclosure, the guide rails 318 are formed such that they have an overall lower mass, smaller size than compared with guide rails of window regulator currently in used. The overall lower mass and smaller size of the guide rails allows the costs associated with their manufacture to be much less. As such, lower cost, smaller size and lower mass guide rails are desirable. However, these lower cost, smaller size and lower mass guide rails must also be able to provide the desired structural integrity required of the window regulator 316, which is provided by the exemplary embodiments of the present disclosure. As used herein low mass refers to a guide rail having a mass of less than 150 grams. As used herein, smaller size refers to a guide rail having an exterior profile for example a square or rectangular configuration wherein the dimensions of the exterior profile of the square or rectangular configuration of the guide rail are no greater than 10 mm.

Moreover and when the guide rails 318 are formed in such a manner (e.g., low mass and smaller size (square or rectangle exterior profile) the guide rails 318 are typically stiffer than a rolled or stamped guide rail.

In addition and in one non-limiting embodiment, the housing portion 330 and the housing or feature 326 are formed from an easily molded material such as a plastic material, metal insert reinforced plastic or a plastic composite material. Alternatively, the guide rail 18 may be solid. In various embodiments of the present disclosure, the guide rail may have a square or rectangular configuration or periphery.

Not shown are a controller for controlling the motor 332 and inputs to the controller such as user operated switches and a vehicle control module that may also provide input to the controller. Also not shown is an electric power supply system, which may include a battery and alternator as vehicle electric power supply systems and window controllers are well known in the art, these components are not discussed in further detail.

In one embodiment, the cursor 320 or a portion thereof is configured to completely surround a periphery of the guide rail 318. As such, the portion of the cursor 320 surrounding the guide rail 318 will have multiple contact points with the guide rail in order to provide multiple points of contact in order to prevent undesired twisting or rotation of the cursor as it slides up and down the guide rail 318 in the direction of arrows 338. In being understood, the some minor rotation or twisting of the cursor 320 about an axis (extending generally in the direction of arrows 338) of the guide rail 318 is acceptable for operation of the window regulator.

In yet another alternative embodiment, the guide rail 318 may be a three sided structure with an opening or channel such as a substantially "C" or "U" shaped configuration when viewed from an end or in a cross-sectional view. In one non-limiting embodiment, the guide rail 318 may be formed as a single unitary piece that may be formed from a metal such as aluminum, steel, metallic alloys or the guide rail 318 is formed from a plastic material, or a plastic composite material.

When a cursor 320 is used that has a portion that completely surrounds the guide rail 318 and the housing 336 or 326 is secured to the lower end or upper end of the guide rail 318, the opposite end of the guide rail 318 has to be open so that the cursor 320 can be slid on the guide rail 318 and thereafter a housing or feature 326 or 336 is secured to the opposite end (e.g., bottom or top) after the cursor 320 is slid onto the guide rail 318. As mentioned above, the housing or feature 326 is configured to rotationally receive a pulley 324 or is formed to have a cam feature 324 for guiding the cable 322 therethrough. In addition, the housing or feature 336 is configured to rotationally receive a pulley 334 or is formed to have a cam feature 334 for guiding the cable 322 therethrough.

Alternatively and in some of the aforementioned embodiments the cursor 320 may be only configured to ride or slide on three sides of the guide rail. In these embodiments, the cursor 320 can be snap fitted onto the guide rail 318. As such, there may be no need to leave one of the ends of the guide rail 318 open.

Figure 20:
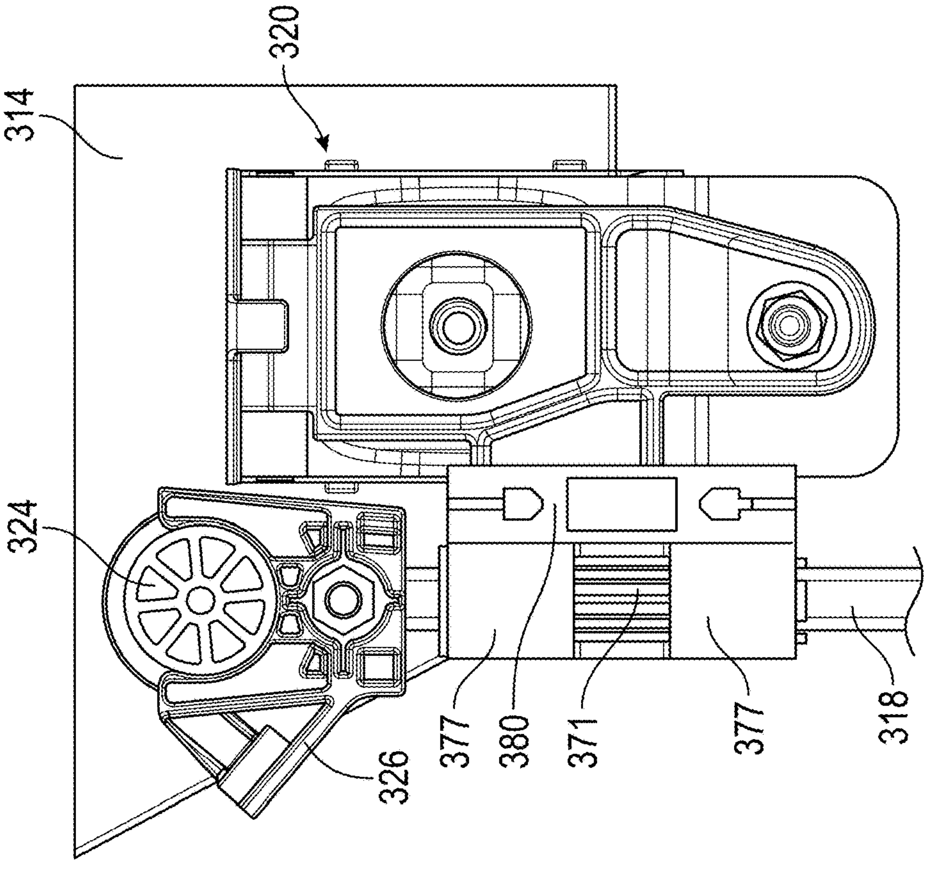
FIG. 20 illustrates the placement of a cursor on a window regulator in accordance with an embodiment of the present application.
Figure 21:
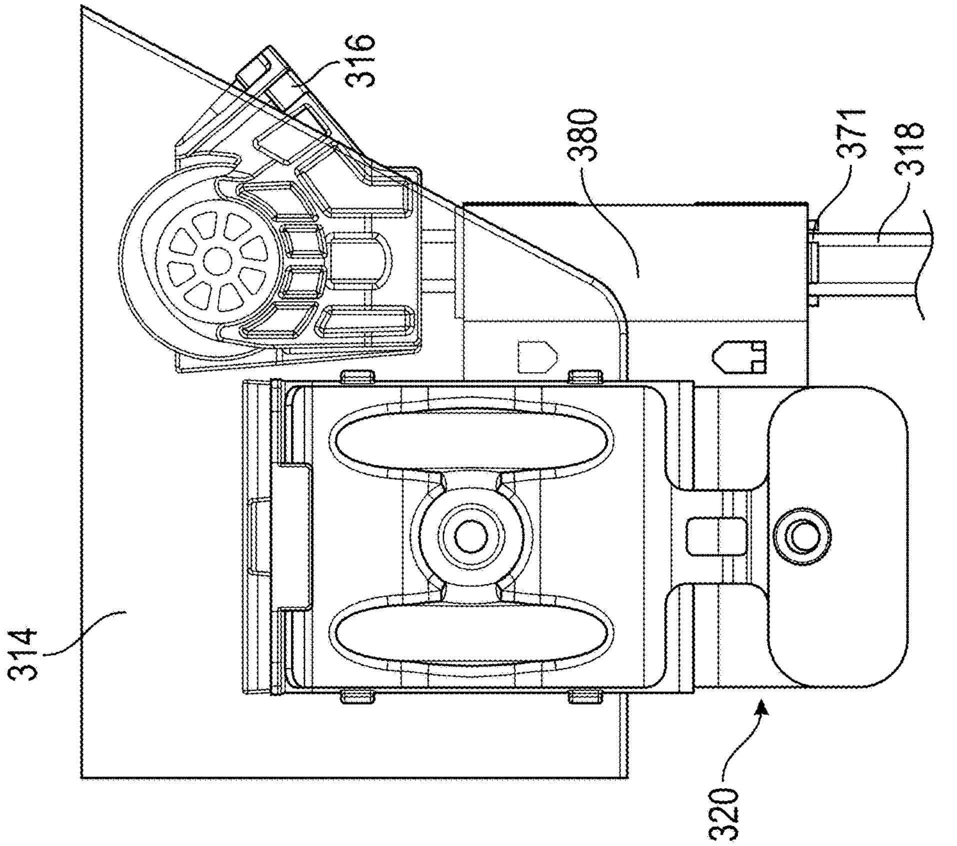
FIG. 21 is an opposite side view of FIG. 20.

Referring now to FIGS. 20 and 21, a cursor 320 contemplated for use with any of the aforementioned embodiments disclosed in the present application is illustrated. In the illustrated window regulator 316, the cursor 320 used with the guide rails 318 has a portion 380 that slidably engages the guide rail 318 and the portion 380 has at least one opening that has the same configuration of the guide rail 318 such that the cursor 320 can be used on the forward or front rail and the rearward or aft rail and vice versa, this allows for the least amount of changes for the cursor design.

FIG. 20 illustrates the approximate rail 318 placement through the portion 380 of the cursor 320. Referring now to FIGS. 20 and 21, the cursor 320 is configured to have a polyoxymethylene (POM) insert 371 that defines an opening for the guide rail 318 to slide therethrough. In this embodiment, the insert 371 is located within the at least opening of the portion 380. Of course, other materials are contemplated for the inset 371. In one embodiment, the guide rail 318 has a rectangular periphery and the portion 380 or insert 371 of the cursor 320 completely surrounds the guide rail 318. In other words, the portion 380 or insert 371 will have an opening configured to match the exterior of the guide rail (e.g., rectangle etc.) such that the portion 380 or insert 371 can slidably engage the guide rail 318 it is located on. For example, the opening of the portion 380 or insert 371 is slightly larger than the exterior of the guide rail 318 so that the slidable movement of the cursor 320 along the guide rail 318 is possible.

In one embodiment, the portion 380 of the cursor 320 is formed coextensively with the polyoxymethylene (POM) insert 371. Alternatively, the portion 380 of the cursor 320 and the insert 371 are separately formed and secured together. In one embodiment, the portion 80 of the cursor 320 is formed from nylon and the insert 371 is a polyoxymethylene (POM) insert 371. In yet one other embodiment, the portion 380 of the cursor(s) 320 are formed from an easily molded material such as a plastic material.

In one alternative embodiment, the portion of the cursor 320 may be formed from polyoxymethylene (POM) and the insert 371 may be formed from nylon.

The portion 380 of the cursor 320 may be configured to have a feature or two or multiple separate features 377 positioned about or formed coextensively with the polyoxymethylene (POM) insert 371. As such, the features 377 will match the outer periphery of the insert 371. Alternatively, the portions 380 of the cursor(s) 320 may be separately formed and the polyoxymethylene (POM) insert 371 may be separately formed and the polyoxymethylene (POM) insert 371 is slid into the feature(s) 377. In this embodiment, the openings of the features 377 will match the exterior features of the insert 371 and the interior opening of the insert will match the exterior periphery of the guide rail 318.

In addition, the cursor 320 may have a component or components that configured to be secured to the window 314 and are adjustably secured to the portion 380 of the cursor 320 such that pivotal adjustment of the component or components and the window 314 with respect to the guide rail 318 and/or the window regulator 316 is possible. As such, pivotal adjustment of the window 314 with respect to the vehicle door 312 is possible.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates to one or more structural limitations of a device that are required for the device to perform the function or operation for which the device is configured.

The disclosure illustratively disclosed herein may be practiced in the absence of any element which is not specifically disclosed herein.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A window regulator for raising and lowering a window of a vehicle, comprising:

a first guide rail;

a first cursor slidably mounted to the first guide rail;

a second guide rail spaced from the first guide rail;

a second cursor slidably mounted to the second guide rail;

a flange portion comprising a rail mounting portion, an arm portion and a mounting portion, the flange portion is secured to a bottom end of the first guide rail via only the rail mounting portion of the flange portion, and the arm portion and the mounting portion extend from a portion of the rail mounting portion that is spaced from the bottom end of the first guide rail, the mounting portion terminating at a distal end of the mounting portion that is spaced from a top end of the first guide rail, the arm portion and the mounting portion themselves do not directly contact the first guide rail;

a motor operably coupled to the first cursor and the second cursor such that operation of the motor causes the first cursor to slide along the first guide rail and the second cursor to slide along the second guide rail, the motor being mounted to the mounting portion, wherein the motor when mounted to the mounting portion is located adjacent to a side of the first guide rail located between the bottom end of the first guide rail and the top end of the first guide rail and the first cursor being capable of sliding along a portion of the first guide rail that is adjacent to the arm portion and the mounting portion such that a portion of the first cursor can be located between the first guide rail and the mounting portion and at least a portion of the arm portion, and wherein the motor is closer to the bottom end of the first guide rail than the top end of the first guide rail; and a lower pulley rotationally mounted to the rail mounting portion and an upper pulley rotationally secured to the top end of the first guide rail by a first housing;

wherein a rotational axis of the lower pulley is positioned within a width of the first guide rail.

2. The window regulator as in claim 1, further comprising a cable drum rotationally mounted to the flange portion, the cable drum being operably coupled to the motor and at least one cable secured to the cable drum at one end and the first cursor and the second cursor at another end.

3. The window regulator as in claim 1, wherein the first guide rail is a three sided structure with an opening and the first guide rail is insert molded onto the flange portion, the flange portion has a structural member that extends into the opening.

4. The window regulator as in claim 1, wherein the first guide rail has a rectangular periphery and a portion of the first cursor completely surrounds the first guide rail and wherein the second guide rail has a rectangular periphery and a portion of the second cursor completely surrounds the second guide rail.

5. The window regulator as in claim 4, wherein the first guide rail and the second guide rail are hollow.

6. The window regulator as in claim 4, wherein the portion of the first cursor surrounding the first guide rail has multiple contact points with the first guide rail in order to prevent undesired movement of the first cursor as the first cursor slides up and down the first guide rail, and wherein the portion of the second cursor surrounding the second guide rail has multiple contact points with the second guide rail in order to prevent undesired movement of the second cursor as the second cursor slides up and down the second guide rail.

7. The window regulator as in claim 1, wherein the rail mounting portion, the arm portion and the mounting portion are all formed as a single piece.

8. The window regulator as in claim 1, wherein the motor extends in a direction generally parallel to the first guide rail.

9. The window regulator as in claim 1, wherein a pair of cables are secured to a cable drum rotationally mounted to the flange portion at one end and one of the pair of cables is secured to the first cursor at another end and the other one of the pair of cables is secured to the second cursor at another end.

10. The window regulator as in claim 4, wherein the first cursor has an insert that defines an opening for the first guide rail to slide therethrough and the second cursor has an insert that defines an opening for the second guide rail to slide therethrough.

11. The window regulator as in claim 10, wherein the insert of the first cursor is formed from polyoxymethylene (POM) and the first cursor is over-molded onto the insert of the first cursor and the insert of the second cursor is formed from polyoxymethylene (POM) and the second cursor is over-molded onto the insert of the second cursor.

12. The window regulator as in claim 11, wherein the first cursor and the second cursor are formed from nylon.

13. The window regulator as in claim 1, further comprising the lower pulley rotationally mounted to the rail mounting portion and the upper pulley rotationally secured to the top end of the first guide rail by the first housing and a lower pulley rotationally mounted to a bottom end of the second guide rail by a second housing, the first housing and the second housing having the same configuration.

14. The window regulator as in claim 13, further comprising a pulley rotationally secured to a top end of the second guide rail by a third housing, the third housing being a mirror image of the first housing.

15. The window regulator as in claim 14, wherein the first guide rail has a rectangular periphery and a portion of the first cursor completely surrounds the first guide rail and wherein the second guide rail has a rectangular periphery and a portion of the second cursor completely surrounds the second guide rail and wherein the first guide rail and the second guide rail are hollow.

16. The window regulator as in claim 1, wherein the first cursor has an insert that defines an opening for the first guide rail to slide therethrough and the second cursor has an insert that defines an opening for the second guide rail to slide therethrough.

17. A window regulator for raising and lowering a window of a vehicle, comprising:

a first guide rail;

a first cursor slidably mounted to the first guide rail;

a second guide rail spaced from the first guide rail;

a second cursor slidably mounted to the second guide rail;

a flange portion comprising a rail mounting portion, an arm portion and a mounting portion, the flange portion is secured to a top end of the first guide rail, and the arm portion and the mounting portion extend from a portion of the rail mounting portion that is spaced from the bottom end of the first guide rail, the mounting portion terminating at a distal end that is spaced from the top end of the first guide rail via only the rail mounting portion of the flange portion, the arm portion and the mounting portion themselves do not directly contact the first guide rail, wherein the mounting portion is only secured to the top end of the first guide rail via the rail mounting portion;

a motor operably coupled to the first cursor and the second cursor such that operation of the motor causes the first cursor to slide along the first guide rail and the second cursor to slide along the second guide rail, the motor being mounted to the mounting portion, wherein the motor when mounted to the mounting portion is located adjacent to a side of the first guide rail located between the bottom end of the first guide rail and the top end of the first guide rail and the first cursor being capable of sliding along a portion of the first guide rail that is adjacent to the arm portion and the mounting portion such that a portion of the first cursor can be located between the first guide rail and the mounting portion and at least a portion of the arm portion and wherein the motor is closer to the top end of the first guide rail than the bottom end of the first guide rail; and an upper pulley rotationally mounted to the rail mounting portion and a lower pulley rotationally secured to the bottom end of the first guide rail by a housing;

wherein a rotational axis of the upper pulley is positioned within a width of the first guide rail.

* * * * *